(12) United States Patent
Sharma et al.

(10) Patent No.: US 11,095,539 B2
(45) Date of Patent: Aug. 17, 2021

(54) COMMON INTERFACE SYSTEM FOR MESH NETWORKING AND FOG COMPUTING SYSTEMS

(71) Applicant: Intel Corporation, Santa Clara, CA (US)

(72) Inventors: Rahul Sharma, Folsom, CA (US); Katalin K. Bartfai-Walcott, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/638,461

(22) PCT Filed: Sep. 13, 2017

(86) PCT No.: PCT/US2017/051388
§ 371 (c)(1),
(2) Date: Feb. 11, 2020

(87) PCT Pub. No.: WO2019/055004
PCT Pub. Date: Mar. 21, 2019

(65) Prior Publication Data
US 2020/0374205 A1 Nov. 26, 2020

(51) Int. Cl.
*H04L 12/26* (2006.01)
*H04W 84/12* (2009.01)
*H04W 84/18* (2009.01)

(52) U.S. Cl.
CPC .......... *H04L 43/065* (2013.01); *H04W 84/12* (2013.01); *H04W 84/18* (2013.01)

(58) Field of Classification Search
CPC ....... H04L 43/065; H04L 67/10; H04L 29/08; H04W 84/12; H04W 84/18
See application file for complete search history.

(56) References Cited

U.S. PATENT DOCUMENTS 9,618,222 B1    4/2017   Hussain et al.
2016/0241641 A1  8/2016  Mazar
(Continued)

FOREIGN PATENT DOCUMENTS

CN       204946383 U  * 1/2016
KR    10-2015-012109 A   10/2015
(Continued)

OTHER PUBLICATIONS

International Search Report and Written Opinion dated Jun. 7, 2018 for International Patent Application No. PCT/US2017/051388; 17 pages.
(Continued)

*Primary Examiner* — Michael A Keller
(74) *Attorney, Agent, or Firm* — Schwabe, Williamson & Wyatt, P.C.

(57) ABSTRACT

Methods, systems, and storage media are described for Internet of Things (IoT) hubs and IoT cradles in mesh networks and/or fog computing systems while providing interoperability among IoT devices provided by various manufacturers, vendors, and service providers. IoT devices may be connected or attached to IoT cradles, and the IoT cradles may communicate data among themselves over a cradle network. The IoT cradles may also communicate IoT data with the IoT hub over a hub network. The IoT hub may communicate the IoT data with clients and/or servers over a wide area network using wired or wireless communication protocols. Clients may access resources and/or services provided by the IoT devices by accessing the IoT hub via a dedicated application. Other embodiments may be described and/or claimed.

27 Claims, 11 Drawing Sheets

(56) References Cited

U.S. PATENT DOCUMENTS

| | | | |
|---|---|---|---|
| 2016/0366181 A1 | 12/2016 | Smith et al. | |
| 2017/0220940 A1 | 8/2017 | Shaashua et al. | |
| 2018/0324802 A1* | 11/2018 | Watts | H04L 63/10 |
| 2019/0251837 A1* | 8/2019 | Vrabete | G08G 1/0133 |
| 2020/0036792 A1* | 1/2020 | Palin | H04L 67/12 |

FOREIGN PATENT DOCUMENTS

| | | |
|---|---|---|
| WO | WO2014051563 A1 | 4/2014 |
| WO | WO 2014-072991 A1 | 5/2014 |
| WO | WO2016054251 A1 | 4/2016 |

OTHER PUBLICATIONS

"Wink Hub 2", Nov. 2016, 8 pages, retrieved on Feb. 11, 2020 from Internet: <URL:C:\Users\ENL\AppData\Local\Temp\Temp1_Non-Patent References IDF No. 140102.zip\Non-Patent References IDF No. 140102\Wink Wink Hub 2.mht>.

"XS Smart Sensor Pro+ Programming Tool", 2015, 16 pages.

"AIO Gateway", 2016, 16 pages, retrieved on Feb. 11, 2020 from Internet <URL:C:\Users\ENL\AppData\Local\Temp\Temp1_Non-Patent References IDF No. 140102.zip\Non-Patent References IDF No. 140102\mediola AIO Gateway—universal Smart Home Hub. mht>.

"Samsung SmartThings Hub", 2012, 3 pages, retrieved on Feb. 11, 2020 from Internet <URL:C:\Users\ENL\AppData\Local\Temp\Temp1_Non-Patent References IDF No. 140102.zip\Non-Patent References IDF No. 140102\Meet the Samsung SmartThings Hub - Smart-Things Support.mht>.

* cited by examiner

COMMON INTERFACE SYSTEM FOR MESH NETWORKING AND FOG COMPUTING SYSTEMS

CROSS REFERENCE TO RELATED APPLICATIONS

The present application is a national phase entry under 35 U.S.C. § 371 of International Application No. PCT/US2017/051388, filed Sep. 13, 2017, entitled "COMMON INTERFACE SYSTEM FOR MESH NETWORKING AND FOG COMPUTING SYSTEMS," which designated, among the various States, the United States of America, contents of which is hereby incorporated by reference in its entirety.

FIELD

The present disclosure relates to the technical field of mesh networks and fog computing, and in particular, to apparatuses, methods and storage media to be used as hubs and cradles in mesh networks and for computing systems while providing IoT device interoperability capabilities.

BACKGROUND

Mesh networking is a type of ad hoc network wherein each node in the network relays data to other nodes in the network. Many implementations of mesh networks involve the Internet of Things ("IoT"), which is a network of objects or "things", each of which is embedded with hardware and/or software that enable connectivity to the network. An object, device, sensor, or "thing" (also referred to as an "IoT device") that is connected to a network typically provides information to a manufacturer, operator, and/or other connected devices in order to track usage of the object and/or obtain services. IoT devices are deployed in homes, offices, manufacturing facilities, and/or other like environments. When IoT devices, such as autonomous sensors, are deployed in a certain environment, that environment may be referred to as a "smart environment." For example, when IoT devices, such as autonomous sensors, are deployed in a home, that home may be referred to as a "smart home." To provide various services, service providers, vendors, or device manufacturers (MFGs) may allow customers/users to deploy and operate their own network of IoT devices, and service providers, vendors, and MFGs may provide platforms to control the IoT devices in an IoT network and/or analyze data based on sensed information or captured events.

Most mesh networking solutions for IoT devices implement a walled-garden approach where sensors, sensor hubs, and other devices (e.g., electro-mechanical components (EMCs)) provided by a particular service provider, vendor, or MFG are only capable of operating with other sensors/hubs/devices produced or sold by that particular service provider, vendor, or MFG. This means that devices provided by different service providers, vendors, or MFGs typically do not interact with one another and also require individual platforms to control the devices provided by individual service providers, vendors, and MFGs. This may result in network degradation as the different devices compete for the same network resources without a common traffic management scheme.

One solution to such issues includes using a dedicated hub to control the various IoT devices deployed in an environment. These hubs are sometimes referred to as "sensor hubs", "gateways", "home controllers", "smart things hubs", and/or the like. In order to provide interoperability between IoT devices provided by different service providers, vendors, or MFGs, conventional hubs require the installation of drivers for each make or model of IoT device and/or middleware applications for protocol conversion so that the hub may interact with devices provided by various service providers, vendors, and MFGs. In addition to taking up limited memory of the hub, the middleware or drivers may need to be updated on a regular basis, which means that the quality of the hub's operation and/or interoperability among IoT devices depends upon the quality of administration provided by a user of the hub and the quality of released updates by the individual service providers, vendors, and MFGs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
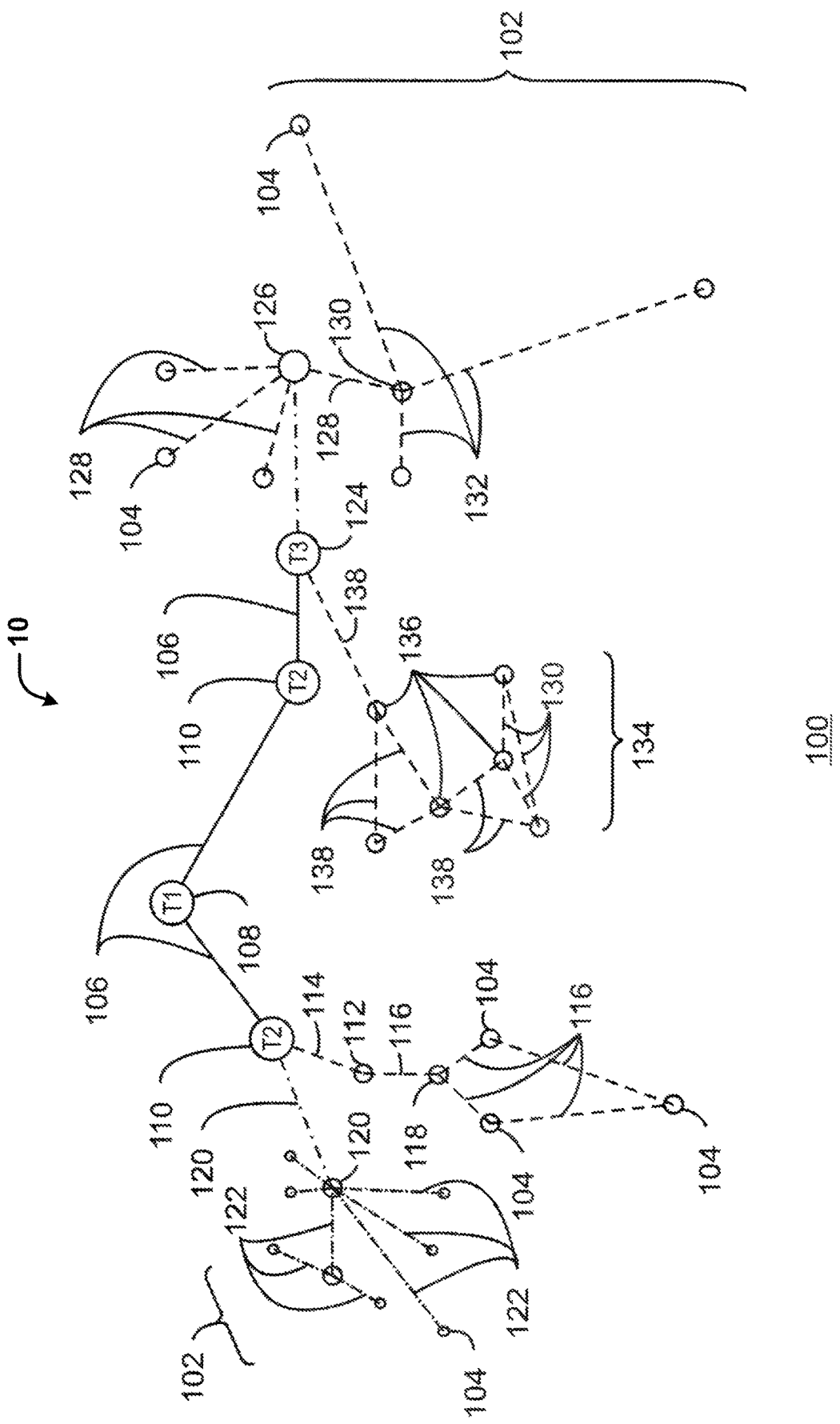
FIG. 1 illustrates an arrangement showing interconnections that may be present between a network and Internet of Things (IoT) networks, in accordance with various embodiments.

Embodiments discussed herein are directed towards hubs and cradles for mesh networking and fog computing while providing device interoperability capabilities. In embodiments, a hub and one or more cradles are provided as a base layer for one or more levels of complexity in of a building (e.g., home, office, retail establishment, restaurant, factory or manufacturing facility, etc.) to convert the building into a "smart" building. Most existing smart buildings, such as a single family home or a multi-story office building, need set of sensors, actuators and a hub for them to control different aspects/services. Existing solutions for implementing a smart building have the following drawbacks:

lack of single platform or system to control all categories of sensors and actuators;

systems from various manufacturers (MFGs and vendors are not compatible enough to share data and bridge the bandwidth gaps for sensors deployed at relatively large distances for the hub;

different smart device categories/services (e.g., surveillance system, connected lighting systems, temperature control systems, etc.), which may be provided by different MFGs, vendors, etc., typically include their own hubs and applications for authentication, policy management, and actuation making it difficult to manage and access individual systems or services;

smart devices and/or smart device categories/services provided by different MFGs, vendors, etc. may include different communication technologies, and therefore, they lack a common device interconnect;

smart devices provided by different MFGs, vendors, etc. may have their own installation procedures, which may be specific to deployment area/region (e.g., an installation procedure may need to be repeated when one or more smart devices are re-located to a new area);

most hubs are not scalable since they have limits on the number of devices they can control; there is no standard communication protocol to securely share data between devices provided by different MFGs, vendors, etc.;

conventional routers have a limited number of local area network (LAN) ports and can only handle a limited number of wireless devices in an efficient manner, making conventional routers less-than-desirable smart building hubs; and multiple devices connected to common wireless LAN may cause network or smart building system degradation as each device contends for network resources and conventional hubs/routers fail to provide proper traffic management.

Embodiments of the smart building system discussed herein solves or alleviates the previously mentioned drawbacks by providing a standard access and control interface for various smart devices (also referred to as "Internet of Things devices" or "IoT devices") via a cradle or base plate and a hub. The hub may be a gateway device (e.g., a router, switch, cable modem, etc.) that provides communication to remote systems (e.g., the internet) for the cradles and individual IoT devices connected to each cradle, and also manages policies/configurations for communication among the cradles. The cradles may be devices to which one or more IoT devices (e.g., autonomous sensors, EMCs, etc.) may be attached using standard interconnection interfaces. The interfaces may include wireless interfaces, wired connections, and/or input/output pins. Each cradle may also include a programmatic communication interface (e.g., a field-programmable device (FPD)) that allows each cradle to communicate with other cradles over a cradle-cradle network and with one or more hubs over a cradle-hub network.

Additionally, each cradle may implement a data plane entity or layer and a control plane entity/layer. The data plane entity/layer may be used to collect IoT data from attached IoT devices and provide that IoT data to other IoT devices attached to other cradles and/or a hub. The control plane entity/layer may be used to collect hardware capability data (HCD) and/or hardware state data (HSD) from attached IoT devices, which may be provided to other cradles and/or hubs. IoT devices provided by different service providers, vendors, and/or manufacturers (MFGs) may use the HCD and/or HSD to interact with one another via their corresponding cradles without requiring specific middleware or drivers provided by different service providers, vendors, and/or MFGs.

In some cases, the arrangement 50 may be base installation of empty cradles and a HUB can be easily provided by construction contractor for a new buildings or it can be added to the existing home/office locations In the following detailed description, reference is made to the accompanying drawings that form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "circuitry" may refer to, be part of, or include an Application Specific Integrated Circuit (ASIC), a Field Programmable Gate Array (FPGA), an electronic circuit, a processor (shared, dedicated, or group), a graphics processing unit (GPU), and/or memory (shared, dedicated, or group) that execute one or more software or firmware programs having machine instructions (generated from assembler instructions or compiled from higher level language instructions), a combinational logic circuit, and/or other suitable components that provide the described functionality. As used herein, the term "module" may include logic (including operating systems or application instructions, data, etc.) at least partially operable in circuitry. The circuitry may implement the module to cause the module to perform operations described herein. As used herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc. The term "computer system" may include any type interconnected electronic devices, computer devices, or components thereof, such as cellular phones or smart phones, tablet personal computers, wearable computing devices, an autonomous sensors, laptop computers, desktop personal computers, video game consoles, digital media players, handheld messaging devices, personal data assistants, an electronic book readers, augmented reality devices, in-vehicle infotainment (IVI) and/or an in-car entertainment (ICE) devices, vehicle-to-vehicle (V2V) or vehicle-to-everything (V2X) communication systems, Universal Serial Bus (USB) hubs, Keyboard Video Mouse (KVM) switches/hubs, docking stations, docks, sensor cradles, IoT cradles, cradles, port replicators, server computer devices (e.g., stand-alone, rack-mounted, blade, etc.), cloud computing services/systems, network elements, and/or any other like electronic devices. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

As used herein, the term "network element" may refer to one or more computer devices or one or more electronic devices that provide (or provide access to) one or more wired or wireless networks. A "network element" may be considered synonymous to and/or referred to as a networked computer, networking hardware, network equipment, access point, router, switch, hub, bridge, gateway, base station, core network element, server, and/or other like device. The term "network element" may describe equipment that provides radio baseband functions for data and/or voice connectivity between a network element and one or more users. As used herein, a "network element" may comprise one or more devices that provide multiple radio frequency networks.

As used herein, the term "link" as used herein may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used herein, the term "network operator" may be considered synonymous to and/or referred to as a mobile network operator (MNO), cellular network operator, wireless service provider, wireless carrier, mobile network carrier, virtual MNO, and/or the like. The term "network operator" may describe any provider of services related to a communications network including wired and wireless communications networks. Furthermore, the term "network operator" may describe an entity that owns or controls elements necessary to provide communications network-related services, including radio spectrum allocation including one or more radio spectrum licenses from a regulatory agency, wireless network infrastructure and/or back haul infrastructure, billing and subscription-related services, provisioning computer systems, and/or other like services.

As used herein, the term "computing resource", "hardware resource", "resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network.

As used herein, the term "mesh network" may refer to a network topology in which each node in the network cooperates in the distribution of data in the network by relaying data sent by source node along a route or path until it reaches a destination node. The route or path may comprise a plurality of nodes, wherein the data is propagated along the route or path by hopping from node to node in the route/path until it reaches the destination node. As used herein, the term "fog device", "fog computing", "fog computing system", etc., may refer to a distributed infrastructure or network topology wherein various application processes and/or services are managed or operated by devices located at the edges or ends of a network (e.g., "edge devices") rather than establishing communication channels for a cloud computing service to perform such functions.

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 2:
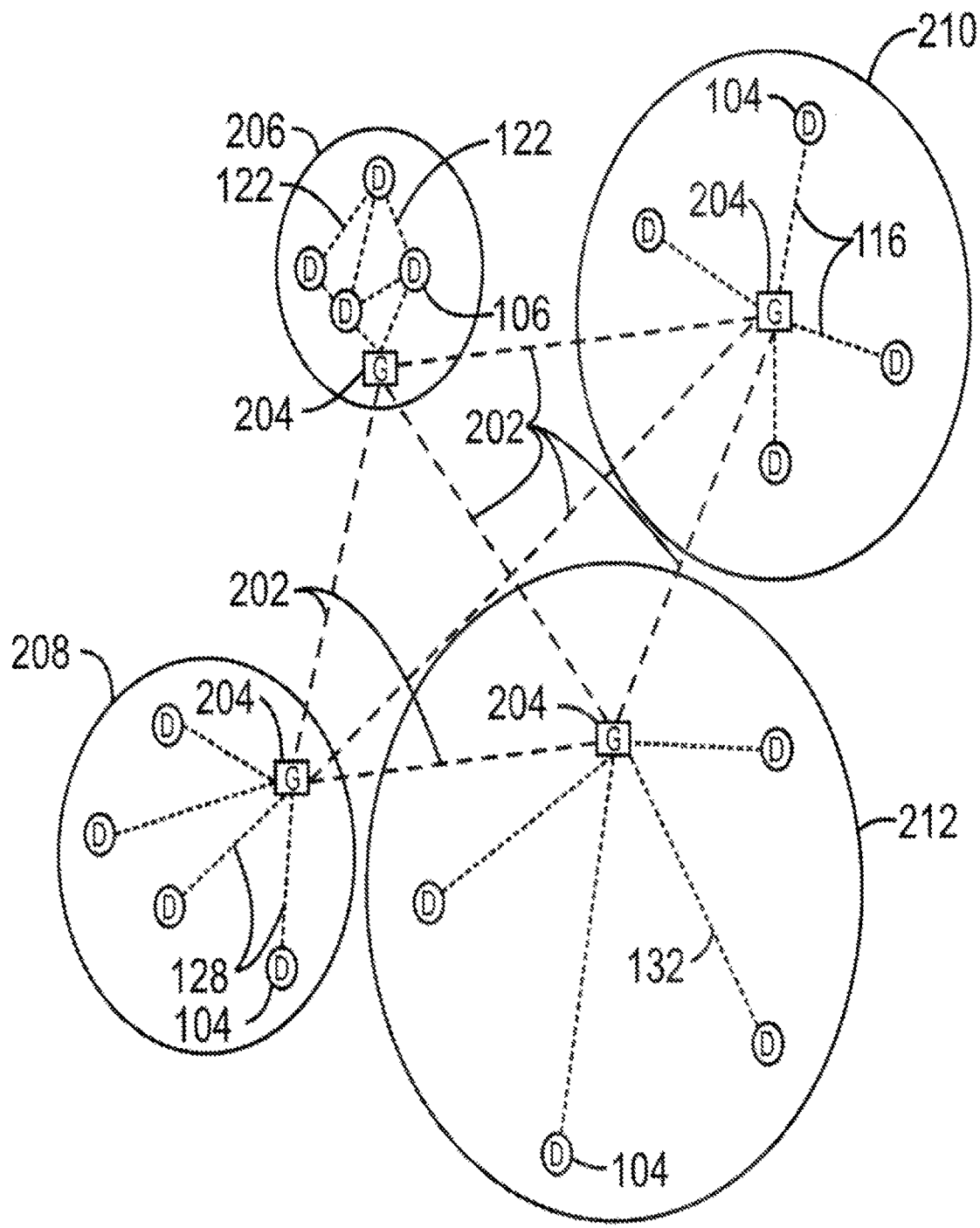
FIG. 2 illustrates an example domain topology, in accordance with various embodiments.

FIG. 1 illustrates an arrangement 10 showing interconnections that may be present between the Internet 100 and IoT networks, in accordance with various embodiments. The interconnections may couple smaller networks 102, down to the individual IoT device 104, to the fiber backbone 106 of the Internet 100. To simplify the drawing, not every device 104, or other object, is labeled.

In FIG. 1, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE cellular network, for example, by further fiber links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116. In another example, a high-speed uplink 120 may couple a tier 2 provider 110 to a gateway (GW) 120. A number of IoT devices 104 may communicate with the GW 120, and with each other through the GW 120, for example, over BLE links 122.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate GW 126 and other customers. From the corporate GW 126, a wireless local area network (WLAN) can be used to communicate with IoT devices 104 through Wi-Fi® links 128. A Wi-Fi link 128 may also be used to couple to a low power wide area (LPWA) GW 130, which can communicate with IoT devices 104 over LPWA links 132, for example, compatible with the LoRaWan specification promulgated by the LoRa alliance.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

IoT devices 104 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 104 may be abiotic devices such as autonomous sensors, gauges, meters, image capture devices, microphones, MTC devices, M2M devices, light emitting devices, audio emitting devices, audio and/or video playback devices, electro-mechanical devices (e.g., switch, actuator, etc.), and the like. In some embodiments, IoT devices 104 may be biotic devices such as monitoring implants, biosensors, biochips, and the like. In other embodiments, an IoT device 104 may be a computer device that is embedded in a computer system and coupled with communication circuitry of the computer system. In such embodiments, the IoT device 104 may be a system on chip (SoC), a universal integrated circuitry card (UICC), an embedded UICC (eUICC), and the like, and the computer system may be a mobile station (e.g., a smartphone) or UE, laptop computer, wearable device (e.g., a smart watch, fitness tracker, etc.), "smart" appliance (e.g., a television, refrigerator, a security system, etc.), and the like.

Each of the IoT devices 104 may include one or more memory devices and one or more processors to capture and store/record data. Each of the IoT devices 104 may include appropriate communication circuitry (e.g., transceiver(s), modem, antenna elements, etc.) to communicate (e.g., transmit and receive) captured and stored/recorded data. Further, each IoT device 104 may include other transceivers for communications using additional protocols and frequencies. This is discussed further with respect to FIGS. 5-8.

According to various embodiments, the IoT devices 104 may be attached to, or otherwise coupled with a cradle within a mesh network or fog computing system. This network or system may comprise a plurality of cradles, each of which including one or more attached IoT devices 104, and at least one hub or gateway device. The hub may manage communications among the various cradles and attached IoT devices 104 in the network/system, and may also provide connectivity to a larger network, such as the internet, an enterprise or private network, a local area network (LAN) or wireless LAN (WLAN), and/or the like. The cradles and hubs may be equipped with information (e.g., referred to as "modem profiles" herein) to configure configurable communication circuitry to perform communications in a corresponding network. This may allow the IoT devices 104 to communicate using multiple wireless communications protocols without requiring an IoT device 104 to include separate hardware communications modules for each wireless communications protocol. The wireless communications protocols may be any suitable set of standardized rules or instructions implemented by the IoT devices 104 to communicate with other devices, including instructions for packetizing/depacketizing data, instructions for modulating/demodulating signals, instructions for implementation of protocols stacks, and the like.

In embodiments, one or more of tower 112, GW 120, 126, and 130, coordinator device 136, and so forth, may also be incorporated with the modem technology described herein, in particular, with references to FIGS. 5-9.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 2 illustrates an example domain topology 200 that may be used for a number of IoT networks coupled through backbone links 202 to GWs 204, in accordance with various embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet. Similar to FIG. 1, in embodiments, one or more of IoT devices 124, GW 204, and so forth, may be incorporated with the modem technology described herein, in particular, with references to FIGS. 5-9.

The network topology 200 may include any number of types of IoT networks, such as a mesh network 206 using BLE links 122. Other IoT networks that may be present include a WLAN network 208, a cellular network 210, and an LPWA network 212. Each of these IoT networks may provide opportunities for new developments, as described herein. For example, communications between IoT devices 104, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
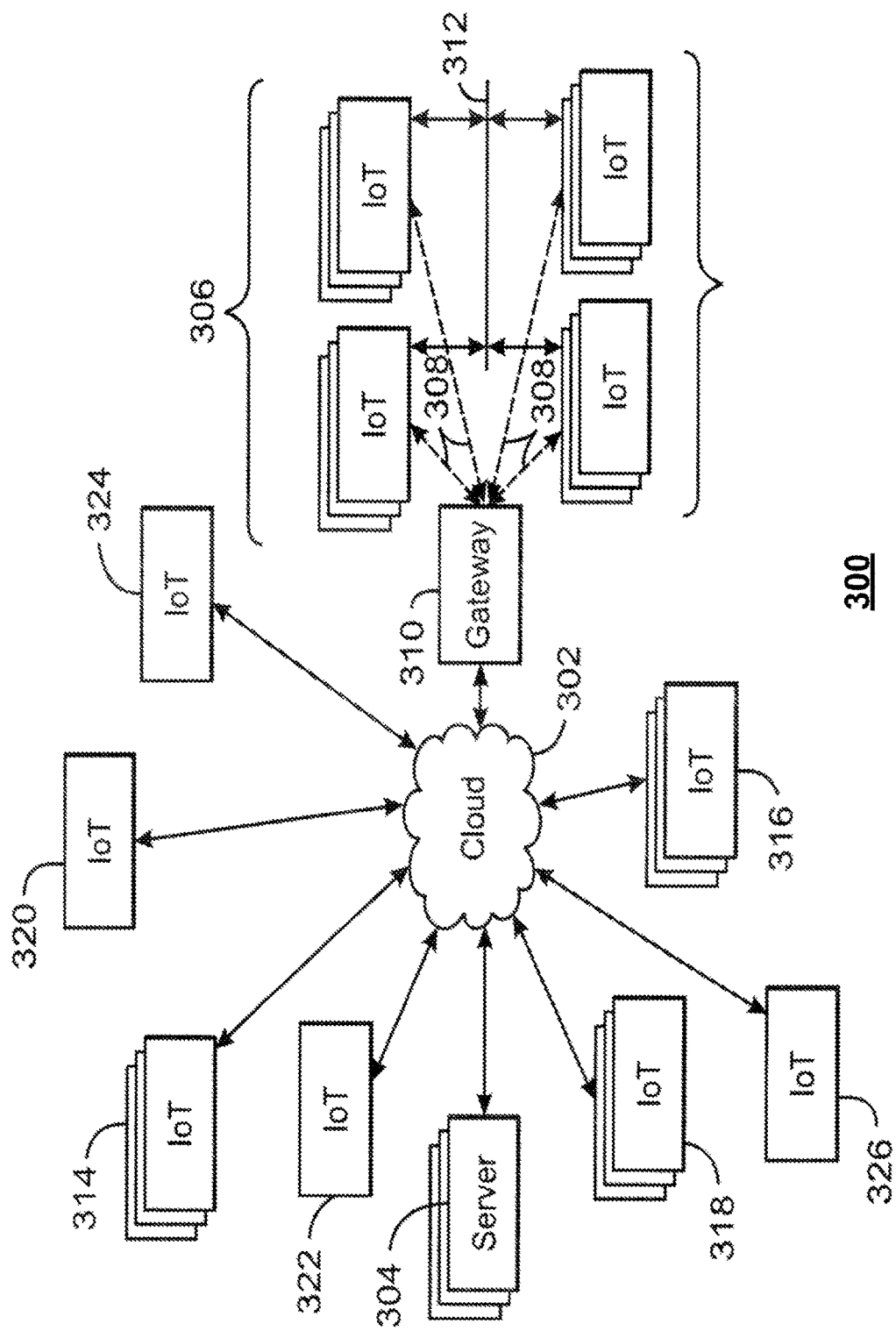
FIG. 3 illustrates an example cloud computing network or cloud in communication with a number of IoT devices, in accordance with various embodiments.

FIG. 3 illustrates an example cloud computing network, or cloud 302, in communication with a number of Internet of Things (IoT) devices, in accordance with various embodiments. The cloud 302 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 302 may be associated with network operator who owns or controls equipment and other elements necessary to provide network-related services, such as one or more base stations or access points, and one or more servers for routing digital data or telephone calls (for example, a core network or backbone network).

The IoT devices in FIG. 3 may be the same or similar to the IoT devices 104 discussed with regard to FIGS. 1-2. The IoT devices may include any number of different types of devices, grouped in various combinations, such as IoT group 306 that may include IoT devices that provide one or more services for a particular user, customer, organizations, etc. A service provider may deploy the IoT devices in the IoT group 306 to a particular area (e.g., a geolocation, building, etc.) in order to provide the one or more services. In one example, the IoT group 306 may be a traffic control group where the IoT devices in the IoT group 306 may include stoplights, traffic flow monitors, cameras, weather sensors, and the like, to provide traffic control and traffic analytics services for a particular municipality or other like entity. Similar to FIGS. 1-2, in embodiments, one or more of IoT devices 314-324, GW 310, and so forth, may be incorporated with the modem technology described herein, in particular, with references to FIGS. 5-9.

The IoT group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a GW 310 to communicate with the cloud 302. Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the IoT group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

In another example, the IoT group 306 may be an industrial control group (also referred to as a "connected factory", an "industry 4.0" group, and the like) where the IoT devices in the IoT group 306 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 306 may communicate with the servers 304 via GW 310 and cloud 302 to provide captured data, which may be used to provide performance monitoring and analytics to the manufacturer or factory operator. Additionally, the IoT devices in the IoT group 306 may communicate among each other, and/or with other IoT devices of other IoT groups, to make decisions on their own and to perform their tasks as autonomously as possible.

Clusters of IoT devices, such as the IoT groups depicted by FIG. 3, may be equipped to communicate with other IoT devices as well as with the cloud 302. This may allow the IoT devices to form an ad-hoc network between the devices, allowing them to function as a single device, which may be termed a fog device or fog system. This is discussed further with respect to FIG. 4.

Figure 4:
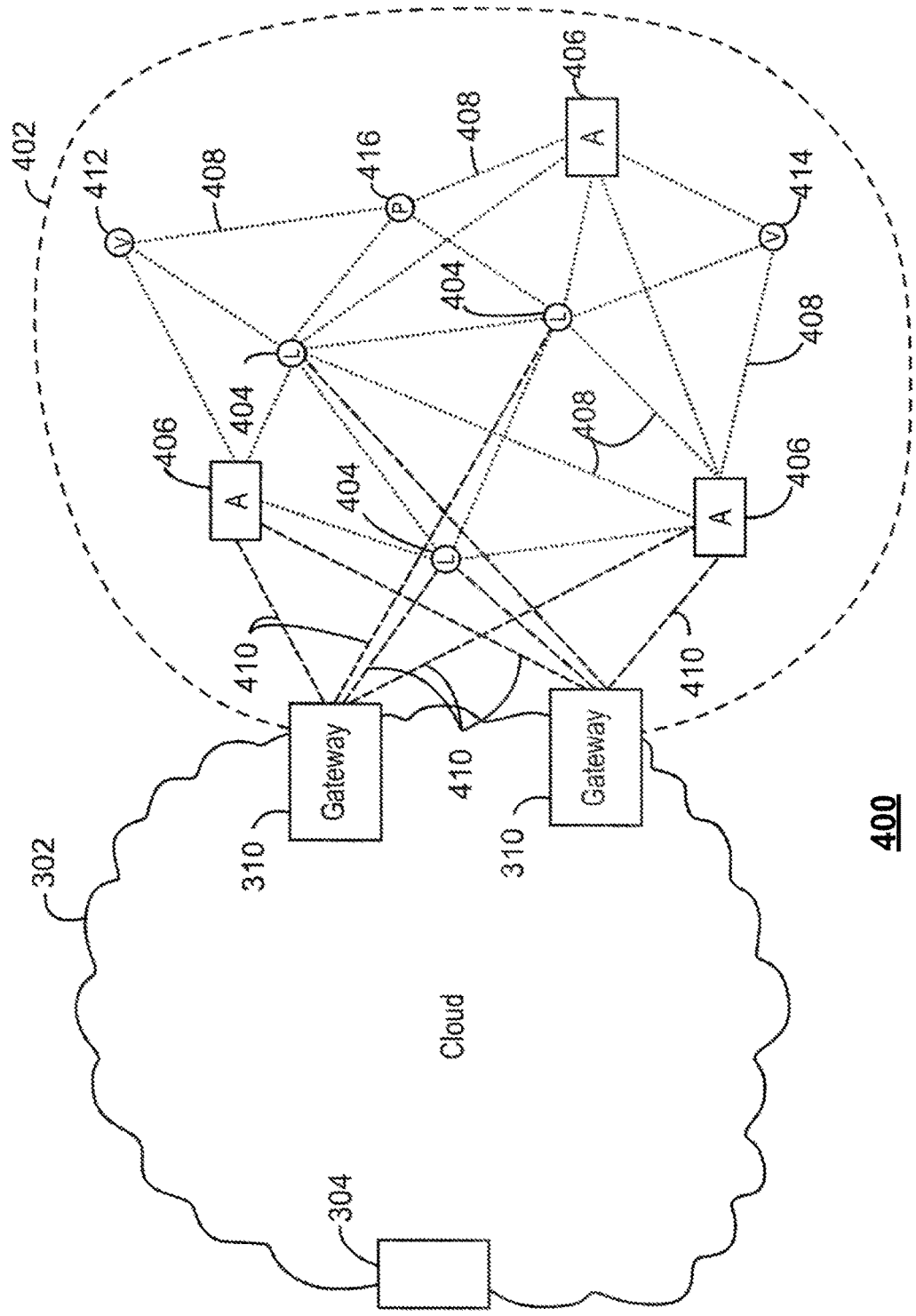
FIG. 4 illustrates an arrangement of a cloud computing network or cloud in communication with a mesh network of IoT devices or IoT fog, in accordance with various embodiments.

FIG. 4 illustrates an arrangement 400 of a cloud computing network, or cloud 302, in communication with a mesh network of IoT devices, which may be termed a fog device 402, operating at the edge of the cloud 302, in accordance with various embodiments. Like numbered items are as described with respect to FIGS. 1-3. In this example, the fog device 402 is a group of IoT devices at an intersection. The fog device 402 may be established in accordance with specifications released by the OpenFog Consortium (OFC), the Open Connectivity Foundation™ (OCF), among others.

Data may be captured, stored/recorded, and communicated among the IoT devices 404. Analysis of the traffic flow and control schemes may be implemented by aggregators 406 that are in communication with the IoT devices 404 and each other through a mesh network. Data may be uploaded to the cloud 302, and commands received from the cloud 302, through GWs 310 that are in communication with the IoT devices 404 and the aggregators 406 through the mesh network. Similar to FIGS. 1-3, in embodiments, one or more of IoT devices 404, aggregators 406, and so forth, may be incorporated with the modem technology described herein, in particular, with references to FIGS. 5-9.

Any number of communications links may be used in the fog device 402. Shorter-range links 508, for example, compatible with IEEE 802.15.4 may provide local communications between IoT devices that are proximate to one another or other devices. Longer-range links 410, for example, compatible with LPWA standards, may provide communications between the IoT devices and the GWs 310. To simplify the diagram, not every communication link 508 or 410 is labeled with a reference number.

The fog device 402 may be considered to be a massively interconnected network wherein a number of IoT devices are in communications with each other, for example, by the communication links 508 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 310. In these networks, the number of interconnections may provide substantial redundancy, allowing communications to be maintained, even with the loss of a number of IoT devices.

Not all of the IoT devices may be permanent members of the fog device 402. In the example in the drawing 400, three transient IoT devices have joined the fog device 402, a first mobile device 412, a second mobile device 414, and a third mobile device 416. The fog device 402 may be presented to clients in the cloud 302, such as the server 304, as a single device located at the edge of the cloud 302. In this example, the control communications to specific resources in the fog device 402 may occur without identifying any specific IoT device 404 within the fog device 402. Accordingly, if any IoT device 404 fails, other IoT devices 404 may be able to discover and control a resource. For example, the IoT devices 404 may be wired so as to allow any one of the IoT devices 404 to control measurements, inputs, outputs, etc., for the other IoT devices 404. The aggregators 406 may also provide redundancy in the control of the IoT devices 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the devices 412, 414, 416, join the fog device 402. As transient or mobile IoT devices enter or leave the fog 402, the fog device 402 may reconfigure itself to include those devices. This may be performed by forming a temporary group of the devices 412 and 414 and the third mobile device 416 to control or otherwise communicate with the IoT devices 404. If one or both of the devices 412, 414 are autonomous, the temporary group may provide instructions to the devices 412, 414. As the transient devices 412, 414, and 416, leave the vicinity of the fog device 402, it may reconfigure itself to eliminate those IoT devices from the network. The fog device 402 may also divide itself into functional units, such as the IoT devices 404 and other IoT devices proximate to a particular area or geographic feature, or other IoT devices that perform a particular function. This type of combination may enable the formation of larger IoT constructs using resources from the fog device 402.

As illustrated by the fog device 402, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 5:
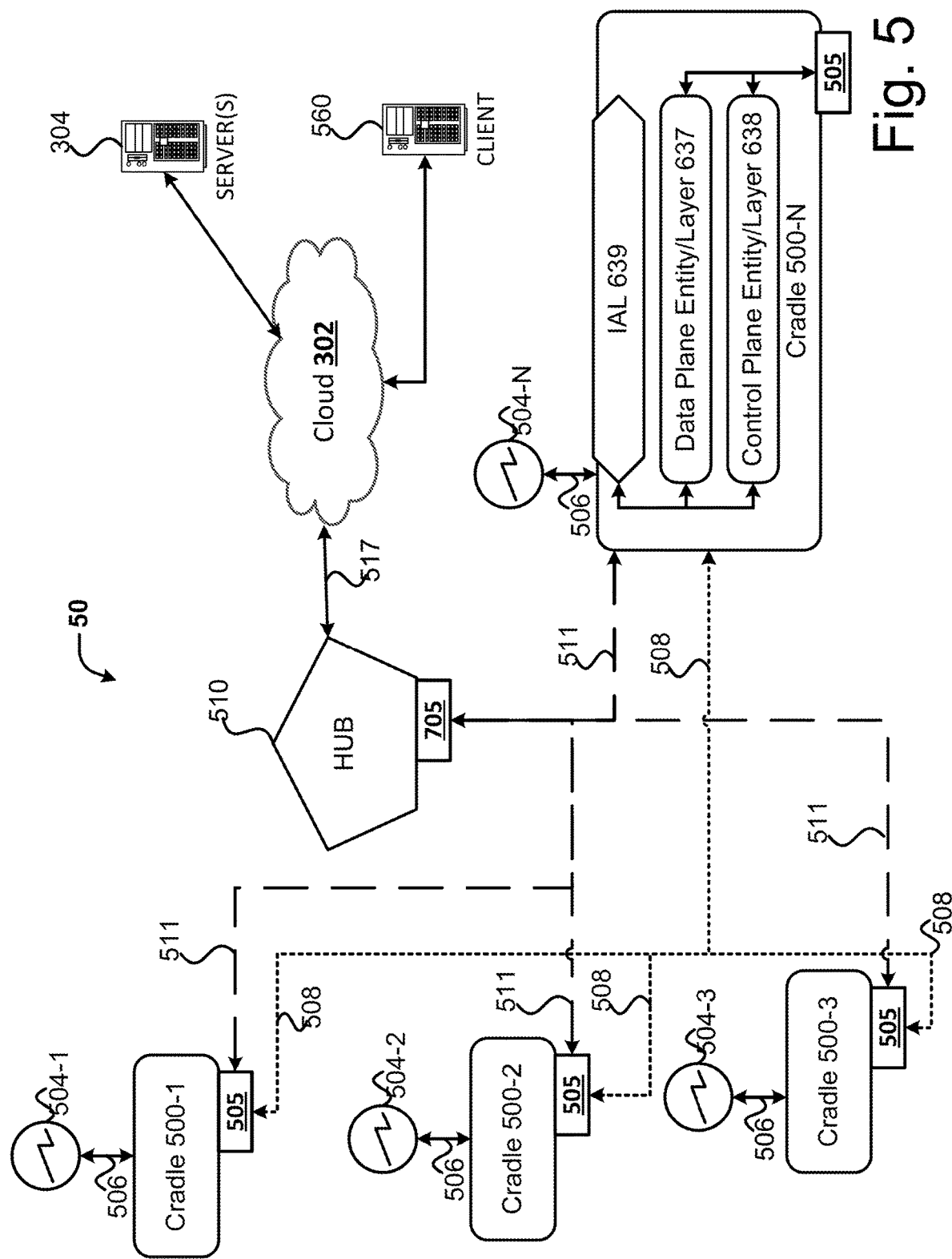
FIG. 5 illustrates an example environment in which various embodiments described in the present disclosure may be implemented.

FIG. 5 shows an arrangement 50 in accordance with various embodiments. Like numbered items are as described with respect to FIGS. 1-4. In FIG. 5, arrangement 50 may include cloud 302, IoT devices 504-1 to 504-N (collectively referred to as "IoT devices 504" and the like), server(s) 304, client computer device 560 (also referred to as "client 560"), hub 510, and cradles 500-1 to 500-N (collectively referred to as "cradle 500", "cradles 500", and the like). Arrangement 50 may include many more devices, components, or other elements than are shown by FIG. 5, and thus, the depiction of the arrangement 50 in FIG. 5 should be taken as being illustrative in nature, and not limited to the scope of the disclosure.

Each of the IoT devices 504 may be a physical hardware device capable of sequentially and automatically carrying out a sequence of arithmetic or logical operations, recording, storing, and/or transferring digital data via a wired or wireless connection with one or more network elements and/or one or more other devices. In embodiments, IoT devices 504 may be an IoT device that is the same or similar to the IoT devices discussed previously (e.g., IoT devices 104, 304, 404). In other embodiments, IoT devices 504 may be a computer device embedded within a computer system, or IoT devices 504 may be some other type of computer device.

IoT devices 504 may include event capture circuitry (not shown by FIG. 5) that is capable of capturing and/or recording data associated with an event with little or no user intervention. The event capture circuitry may include one or more sensors, processors, memory devices, and/or other like components that are configured to sense/detect an event and generate and record/store data associated with the sensed/detected event. An event may be any occurrence of an action, such as a change in a meter/sensor/gauge reading, a detected motion, an electrical output and/or an electrical input, receipt or transmission of one or more messages from/to other devices, a biotic action (e.g., heart rate, glucose level, etc.), a state/position/orientation change, a change in a mode of operation of the IoT devices 504, and the like. In some embodiments, IoT device 504 may be associated with a remote or detached accessory IoT device (also referred to as an "accessory device", "auxiliary device", "auxiliary IoT device", etc.), and the event may be captured by the accessory device. In one example, an accessory device may be a remote temperature sensor that measures/captures a relative temperature, which may capture a specific temperature as an event and report the event to a paired IoT device 504. In another example, an IoT device 504 may be a camera and the accessory device may be a paired motion sensor, wherein when the accessory device detects a motion it may trigger an action on camera IoT device 504.

The service provider (e.g., an operator of the server(s) 304), a user of the client 560 or client 560 itself, and IoT devices 504 may take an appropriate action based on a notification of the event. In various embodiments, an event may be detected, captured, and recorded/stored by the event capture circuitry based on sensor inputs and/or outputs, timer values, user actions, etc. Once event capture circuitry captures and stores/records data associated with an event, the event capture circuitry may notify a service provider (e.g., an operator of the server(s) 304) and/or client 560 of the event by providing the captured data (or a message containing the captured data) to the cradle 500 to which it is attached via interconnect 506. This type of data may be considered synonymous to, and may hereafter be occasionally referred to as "IoT data", "sensor data", "user data", "data plane data", and the like.

Furthermore, each IoT device 504 may generate and provide hardware state data (HSD) to the cradle 500 to which it is attached via interconnect 506. The HSD may be any data that describes the operational state or mode of operation of an entire IoT device 504, individual hardware components/devices within an IoT device 504, or an execution or runtime environment used to execute software components of an IoT device 504. In embodiments, the HSD may indicate an operation state or mode of operation of one or more resources that are provided by an IoT device 504. For example, various capabilities of each IoT device 504 may be organized into a set of resources, each of which may monitor, manage, and/or control parts of the hardware platform or a virtualized platform, a physical or virtual component within a computing environment, and/or physical or virtual component within a particular device. These resources may include information about or access to an entire IoT device 504, a mechanical device attached to or embedded in an IoT device 504, a sensor attached to or embedded in an IoT device 504, memory space, processor/CPU time, processor/CPU usage, hardware time or usage, electrical power, input/output operations, ports or network sockets, channel/link allocation, throughput, and/or the like. This HSD may be considered synonymous to, and may hereafter be occasionally referred to as "hardware state information" or "HSI", "control data", "capability information" or "capability data", "control plane data", and the like.

The process of capturing, recording, and transmitting IoT data and HSD by the IoT devices 504 may be referred to as "reporting." During operation, the IoT devices 504 may report IoT data and/or HSD to an attached cradle 500 on a periodic or cyclical basis and/or in response to a trigger (e.g., upon receipt of a request, in response to an internal or external event, etc.) that is identified by an IoT device 504. The trigger and/or reporting period/cycle may be configured by the cradle 500 and/or the hub 510. Other procedures for reporting data the cradle 500 may be used in various embodiments.

Each cradle 500 may be a base plate, dock, docking station, etc. to which one or more IoT devices 504 can connect using respective interconnect 506. In some embodiments, the cradles 500 may be referred to as "sensor cradles", "IoT device cradles", "IoT cradles", and/or the like. Each cradle 500 may provide the necessary infrastructure for attached IoT devices 504 to communicate data and control commands/instructions, and actuate electromechanical devices. Although FIG. 5 only shows each cradle 500 attached or coupled with a single IoT device 504, in various embodiments, each cradle 500 may be attached or coupled with a plurality of IoT devices 504. As shown, each cradle includes interconnect 506 and communication circuitry 505 (these components are discussed in more detail with regard to FIGS. 6-7).

In embodiments, the interconnect 506 may comprise wired connections between one or more IoT devices 504 and a cradle 500, wireless radio links between one or more IoT devices 504 and a cradle 500, or input/output (I/O) pins between the IoT devices 504 and the cradle 500. In various embodiments, the cradle 500 may implement an interface abstraction layer 639 to send and receive data to/from attached IoT devices 504 over the interconnect 506. Additionally, the cradle 500 may implement one or more collection entities including a data plane entity (DP) 637 and a control plane entity (CP) 638, which may be used to send/receive data to/from the attached IoT device 504 via the IAL 639 and interconnect 506 and send/receive the data collected from the attached IoT devices 504 to/from other cradles 500 and hub 510. Further, to simplify the drawing, only the cradle 500-N is shown to include the collection entities 637-638 and IAL 639; however, it should be understood that all of the cradles 500 may include the same or similar entities/layers as cradle 500-N. The collection entities 637-638 and IAL 639 are discussed in more detail infra with respect to FIG. 6.

The communication circuitry 505 may include one or more hardware devices/components (e.g., transceiver(s), modem, antenna elements, etc.) that allow the cradle 500 to communicate (e.g., transmit and receive) with other devices, such as other cradles 500 and hub 510. According to various embodiments, the communication circuitry 505 may be a configurable device, such as a field-progammable device (FPD) and the like, that may be loaded or provisioned with a modem profile that allows the communication circuitry 505 to perform communications in a corresponding network.

For example, the cradles 500 may be equipped with cradle profiles 675 (see e.g., FIG. 6), which when loaded or provisioned in a configurable modem 640 of the communication circuitry 505 (see e.g., FIG. 6), may enable the cradles 500 to communicate over a cradle network via respective cradle links 508. In embodiments, the cradle network may be a mesh network or a fog computing system/network, and the cradle links 508 may be short-range radio links. The short-range radio link may be established and maintained in accordance with the various wireless communication protocols discussed herein.

In another example, the cradles 500 may be equipped with hub profiles 677 (see e.g., FIG. 6), which when loaded or provisioned in a configurable modem 640 of the communication circuitry 505 (see e.g., FIG. 6), may enable the cradles 500 to communicate with hub 510 over a hub network via respective hub links 511. In embodiments, the hub network may be a wireless local area network (WLAN) (e.g., a WiFi infrastructure or ad-hoc network), a cellular network, or some other network discussed herein; and the hub links 511 may be long-range radio links established and maintained according to the implemented WLAN or cellular communication protocol. In some embodiments, the hub links 511 may be short-range radio links that are the similar to cradle links 508. In such embodiments, the hub links 511 may operate according to a different short-range communication protocol than used for the cradle links 508, or the hub links 511 may operate according to a same short-range communication protocol as the cradle links 508, but using different frequency bands, using a closed subscriber group (CSG) list that includes the hub 510, or some other mechanism to differentiate the hub network from the cradle network.

The hub 510 (also referred to as a "sensor hub", "IoT device hub", "IoT hub", and the like) may be a network element that employs multi-radio frequency networks technology to provide communication services to IoT devices 504 and/or cradles 500 in a given environment 50. In this regard, the hub 510 may act as a centralized hub and/or scheduler for the IoT devices 504 and/or cradles 500. The hub 510 may also communicate data to/from the server(s) 304 and/or client 560 via the cloud 302 on behalf of the IoT devices 504 and/or cradles 500. In this way, hub 510 may act as a single point of contact between devices that are unable to directly connect to larger networks (e.g., cloud 302) and remote computer devices (e.g., server(s) 304 and client 560).

The hub 510 may be the same or similar to the GWs 120, 126, and 130, 204, and 310 discussed previously. In some embodiments, the hub 510 may be a standalone device that is specifically manufactured to provide cradles 500 and/or IoT devices 504 connectivity to cloud 302, such as an IoT GW, an automation hub, a "smart" building hub, and/or the like. In such embodiments, the hub 510 may be communicatively coupled with a wireless access point (WAP) or other like device that may provide network connectivity to the elements in arrangement 50 (not shown by FIG. 5). Further, in such embodiments, the hub 510 may be communicatively coupled with the WAP through a wired or wireless connection. In other embodiments, the hub 510 may be a WAP, a home server coupled with RF communication circuitry, a smallcell base station (e.g., a femtocell, picocell, home evolved nodeB (HeNB), and the like), a router, switch, radio beacon, and/or any other like network element.

To perform these functions, the hub 510 may include one or more processors, communication circuitry 705 (e.g., including a network interface, one or more transmitters/receivers connected to one or more antennas, and the like), and computer readable media. The communication circuitry 705 may be the same or similar to communication circuitry 505 discussed previously. Additionally, the hub 705 may implement the same or similar data collection entities as the cradles 500 to send/receive HSD and IoT data. In embodiments, the one or more transmitters/receivers of the communication circuitry 705 may be configured to wirelessly transmit/receive RF signals to/from one or more cradles 500/IoT devices 504 within the environment 50, and the network interface of the communication circuitry 705 may be configured to transmit/receive data to/from server(s) 304 via cloud 302 using a wired or wireless connection 517. The hub 510 may process and/or route data packets over the wired/wireless connection 517 according to one or more communications protocols discussed herein.

In embodiments, the hub 510 may provide a single hardware and software stack so that all information from connected IoT devices 504 may be shared among themselves. The processor circuitry of the hub 510 may operate a suitable operating system (OS), such as a hub OS (hOS) that provides users (e.g., client 560) the ability to manage the hub 510 platform. Using the hOS, the client 560 may configure different applications or services to utilize a plurality of IoT devices 504 even when those IoT devices 505 would not otherwise be compatible with one another, due to, for example, being provided by different manufacturers, vendors, service providers, etc. To do so, the hOS may host a single application or dashboard graphical user interface (GUI) (collectively referred to as an "app"), which, when operated by a user of client 560, provides the ability to define one or more configurations for the IoT devices 504 in environment 50. The configurations may define operations of various IoT devices 504 to obtain a particular service, as well as various policies for control and access of those IoT devices 504. Based on the defined configurations, appropriate device-specific configuration(s) 635 (see e.g., FIG. 6) may be generated by the hub 510, which may then be provisioned or otherwise provided to the cradles 500. The hub 510, along with the app, may act as a standard platform for developers, MFGs, vendors, service-providers, ets. to build plugins or channels for each of the IoT devices 504 they develop. In this way, a user may access and control all of the IoT devices 504 without having to go through the different cloud computing services and/or using individual applications for each function or service.

Still referring to FIG. 5, the server(s) 304 may comprise one or more hardware computer devices and/or network elements for providing one or more services for client 560. These services may utilize the data captured and reported by the IoT devices 504. The server(s) 304 may obtain event based data from the IoT devices 504, analyze the event-based data, and may be able to generate content, such as text, graphics, audio and/or video, which may be transferred to client 560 via a web server (not shown), which may handle requests and responses, (e.g., requests for information/content and the information/content provided in response). In various embodiments, the server(s) 304 may operate an analytics and/or various services that provide users/customers (e.g., client 560) with the ability to log-in and manage an array of IoT devices 504 using an app discussed previously. In embodiments, the operator of the server(s) 304 may develop and deploy the app, which may be hosted by the hub 510. In other embodiments, the server(s) 304 may host the app, and may generate and push the appropriate device-specific configuration(s) to the hub 510 for disemination to the various cradles 500. In either embodiments, the hub 510 or server(s) 304 may host the app by operating one or more server-side applications, which produce and provide responses to requests obtained from the client 560. The server-side applications (whether operated by the hub 510 or server(s) 304) may be developed using any suitable server-side scripting or programming languages (e.g., Active Server Pages (ASP), ASP.NET, Java, JavaServer Pages (JSP), node.js, Ruby, PHP, Python, etc.). Other languages or development tools, such as a proprietary scripting language, may be used as well.

The server(s) 304 may include a suitable OS that may provide executable program instructions for the general administration and operation of servers, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Additionally, the server(s) 304 may comprise a single physical hardware device, or may be physically or logically connected with other network devices, such that the server(s) 304 may reside on one or more physical hardware devices. Moreover, the server(s) 304 may be connected to, or otherwise associated with, one or more data storage devices (not shown).

Client 560 may be a physical hardware device that is capable of running one or more applications, such as the previously discussed app. Client 560 may include a transmitter/receiver (or alternatively, a transceiver or RF circuitry), memory, one or more processors, one or more sensors (e.g., accelerometers, gyroscopes, image sensors, Global Positioning System ("GPS") receiver, etc.), and/or other like components. Client 560 may communicate (transmit/receive) data with one or more IoT devices 504 via cloud 302 and/or hub 510, and communicate data with server(s) 304 via cloud 302. Client 560 may communicate with the various devices in arrangement 50 in accordance with one or more wireless or wired communications protocols as discussed herein. Client 560 may communicate with one or more IoT device 404 and IoT devices 504 in accordance with one or more wireless communications protocols as discussed herein. Client 560 may be a desktop personal computer (PC), laptop PC, a wireless cellular phone or smartphone, a tablet PC, a wearable computer device, a handheld messaging device, a personal data assistant, an electronic book reader, an augmented reality head-mounted (or helmet-mounted) display device, and/or any other physical or logical device capable of recording, storing, and/or transferring digital data.

The client 560 may implement the app to define policies and/or configurations for accessing and/or managing desired services and subscriptions/purchases, and accessing/managing IoT device 504. The app may be executed within an application container or web browser of the client 560. In this regard, the app may execute programs/scripts and may render markup language documents (e.g., HTML, Extensible Markup Language (XML), JavaScript Object Notation (JSON), etc.) and other content. The programs/scripts executed in the application container or web browser may be written in a client-side scripting language scripting/programming languages (e.g., HTML, Cascading Stylesheets (CSS), JavaScript, ActionScript, Ruby, Python, etc. etc.) and/or using platform-specific development tools (e.g., Microsoft® Visual Studio®, Android® Studio™ integrated development environment (IDE), Apple® iOS® software development kit (SDK), etc.). Other languages or development tools, such as a proprietary scripting language, may be used as well. The app may be platform-specific, such as when the client 560 is implemented in a mobile device, such as a smartphone, tablet computer, and the like. The term "platform-specific" may refer to the platform implemented by the client 560 and/or the platform implemented by the server(s) 304.

Using the app, a user may define configurations by selecting individual operations of the IoT devices 504 for various services. The app may include a user interface that allows the user to define the configurations for utilizing the IoT devices 504. For example, the app may render, in an application container or browser implemented by client 560, graphical user interfaces (GUIs) including one or more graphical control elements (GCEs) that correspond to various functions/services or operations of the IoT devices 504. The GCEs may enable the user to select desired functions/services, IoT device operations, preferences, rules/policies, etc. to define individual configurations 735 (see FIG. 7). In some embodiments, the particular functions/services, IoT device operations, preferences, rules/policies, etc. that may be selected/defined by a user may be limited or expanded according to MFG/vendor/service provider policies, subscription plans and/or purchases, and/or other like criteria.

In response to selection of the one or more GCEs, the app may generate the individual configurations (CFG) 735 and a CFG message to include the individual CFGs 735. Details regarding the contents and functionality of the individual CFGs 735 is discussed infra with regard to FIG. 7. The CFG message may indicate to generate and provision a new cradle-specific CFG 635 and/or update an existing cradle-specific CFG 635 stored by the cradle 500 based on the CFG 735 included in the CFG message. Additionally or alternatively, the CFG message may indicate to delete an existing CFG 635 stored by the cradle 500 and replace the deleted CFG 635 based on the CFG 735 included in the CFG message.

In response to generating the CFG message, the app may send the CFG message to the host (e.g., the hub 510 or server(s) 304). In embodiments, the app may communicate the CFG message to the host directly and/or via the cloud 302 using web-based services, such as state transfer (REST) web services, Constrained Application Protocol (CoAP), Simple Object Access Protocol (SOAP) web services, Rich Site Summary (RSS) services, Message Queue Telemetry Transport (MQTT) services, and/or any other suitable messaging service. Based on the defined configurations, appropriate device-specific configuration(s) may be generated by the hub 510 (or server(s) 304) and updated on the cradles 500. In one example, the CFG message may be an HTTP request message (e.g., POST, PUT, etc.), where a body portion of such messages may include the CFG 735. In this example, the hub 510 may provide an HTTP response message to confirm or acknowledge receipt of the CFG message or indicate failure with a reason for the failure (e.g., using a suitable HTTP status code). Other message types may be used to convey the CFG 735 and receive responses thereto, such as any of the Internet Protocol (IP) messages known and/or discussed herein or messages of a proprietary protocol, wherein the CFG 735 may be located in the header or body portion of such messages.

According to various embodiments, the elements of arrangement 50 may operate as follows.

(A) The cradles 500 and hub 510 may be installed in a building at various locations. In one example, the cradles 500 and hub 510 may be located in one section of a building (e.g., a single room in a building, a floor of a multi-story building, etc.), where each section of the building includes a corresponding system of IoT devices 504, cradles 500, and hubs 510, each of which operates in a same or similar as discussed previously. In some implementations, the devices in each section of the building may be part of a federated smart building system, wherein each hub 510 communicates with a centralized GW device (e.g., a server stack, smallcell base station, and/or any other like network element) that provides access to a larger network (e.g., an enterprise network, the internet, etc.). Installation of these devices can take place during construction of the building or the cradles 500 and hub 510 may be installed in an existing building. In some embodiments, one or more booster devices may also be installed in sections of the building. The booster devices may be computing devices configured to obtain and rebroadcast signals provided by one or more cradles 500 and/or hub 510 and may include wireless repeaters, WiFi range extenders, WAPs, or other like devices. In some implementations, the booster device may utilize powerline communication (PLC) or powerline networking (PLN) to obtain or rebroadcast signals.

Figure 9:
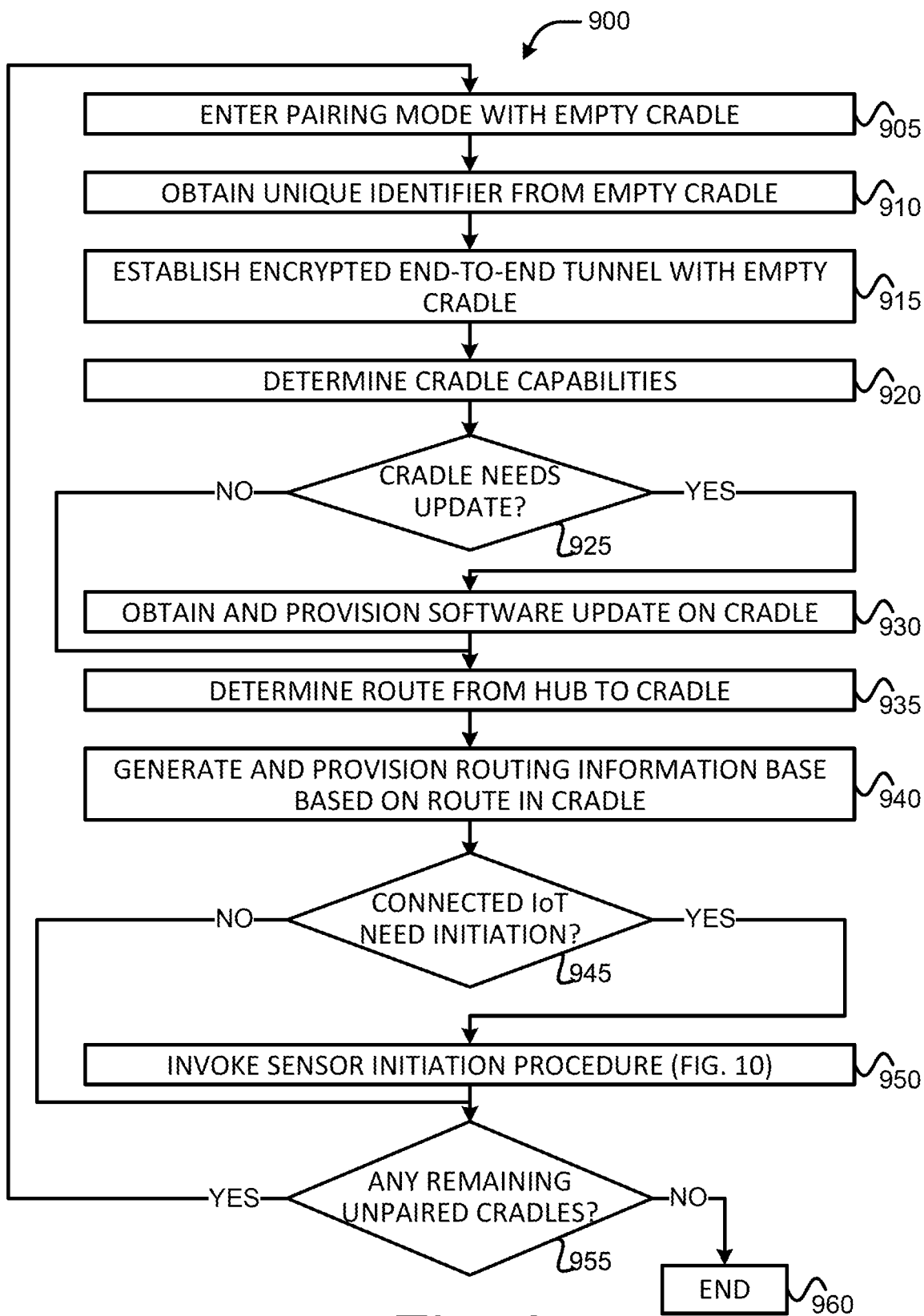
FIG. 9 illustrates an example boot installation process for a newly installed cradle, in accordance with various embodiments.

(B) After the cradles 500 and hub 510 are installed in the building, a cradle installation/boot procedure may be performed (see e.g., process 900 of FIG. 9). In embodiments, the cradle installation/boot procedure is performed when the cradles are empty (e.g., when there are no connected/attached IoT devices 504). Additionally, during the cradle installation/boot procedure, the cradle 500 may receive a routing information base (RIB) 636 (see e.g., FIG. 6) from the hub 510. The RIB 636 may indicate routes for transmitting the IoT data and the HSD to individual IoT cradles 500 and to the hub 510. The RIB 636 is discussed in more detail infra with respect to FIG. 6.

(C) One or more IoT devices 504 are connected to cradles 500. The IoT devices 504 may be connected to the cradles 500 at any time after the installation procedure. For example, a first set of IoT devices 504 may be connected to cradles 500 directly after cradle/hub installation, a second set of IoT devices 504 may be connected to cradles 500 a month after the cradle/hub installation and after the first set of IoT devices 504 are operational. Additionally, previously connected IoT devices 504 may be disconnected and replaced with, for example, updated or improved versions of the IoT devices 504. When a new IoT device 504 is connected to a cradle 500, an IoT device initiation procedure may be performed (see e.g., process 1000 of FIG. 10).

(D) After the sensor initiation procedure is performed, the cradles 500 may begin communicating IoT data and HSD with the attached IoT devices 504 over interconnect 506. The cradles 500 may communicate HSD and/or IoT data among themselves over a cradle network via respective cradle links 508, and/or with the hub 510 over a hub network via respective hub links 511. The communication of HSD/IoT data may be done in accordance with one or more policies/configurations that are provisioned in the cradles 500 by the hub 510 during the sensor initiation procedure and using the RIB 636.

(D.1) When a cradle 500 obtains HSD and/or IoT data from another cradle 500 or from the hub 510, the cradle 500 may provide the HSD or IoT data to one or more attached IoT devices 504, which may be used to provide one or more services/functions.

For example, the IoT device 504-1 may be a motion sensor that is provided by a security monitoring service, the IoT device 504-2 may be a smart thermostat (including one or more temperature sensors) provided by a temperature control device manufacturer, and the IoT device 504-3 may be an electromechanical component (EMC) that opens/closes windows that is developed using a compute board by a hobbyist (e.g., Arduino board, Rhaspberry Pi, etc.). In this example, the user may use the app to define a temperature control configuration that utilizes all three IoT devices 504 for a temperature control service, and define a home security configuration that only utilizes IoT device 504-1 and IoT device 504-3 for a home security service.

Accordingly, the cradle 500-1 may control the communication circuitry 505 to provide collected IoT data indicating that a person is in the building to the cradle 500-2 and the cradle 500-3 over the cradle network for the temperature control service so, for example, a desired temperature can be maintained in the building (e.g., by instructing the IoT device 504-3 to shut or keep the windows closed and instructing the IoT device 504-2 to turn on an air conditioning unit). In this case, the cradle 500-1 may perform a lookup operation on its locally stored RIB 636 to determine the optimum routes for transmitting the IoT data to each of the cradles 500-2 and 500-3.

Additionally, the control plane entity 638 of the cradle 500-3 may control the communication circuitry 505 to provide collected HSD indicating a state of the EMCs to the cradle 500-2 for the temperature control service so that the desired temperature can be maintained in the building. In this case, the cradle 500-3 may perform a lookup operation on its locally stored RIB 636 to determine the optimum route for transmitting the HSD to cradle 500-2. Once received, the hub 510 may provide the HSD or some other indication to the IoT device 504-2 via the interconnect 506 to take a desired action (e.g., shut the air conditioning unit off when the HSD indicates that the window has been opened manually so as to conserve energy, etc.).

Furthermore, the cradle 500-3 may control the communication circuitry 505 to provide collected HSD indicating a state of the EMCs to the hub 510 for the home security service. Once received, the hub 510 may provide the HSD or some other indication to the security monitoring service via cloud 302 (e.g., a break-in alert when the HSD indicates that the window has been pried open or broken, etc.). In this case, the cradle 500-3 may perform a lookup operation on its locally stored RIB 636 to determine the optimum route for transmitting the HSD to hub 510.

(D.2) When the hub 510 obtains the HSD and/or IoT data from the cradles 500, the hub 510 may communicate the HSD and/or IoT data directly to other cradles 500 in arrangement 50, or to other hubs 510 (not shown by FIG. 5) in other sections of the building. The HSD/IoT data may be sent to the cradles 500 in arrangement 50 in a same or similar manner as discussed previously in D.1 except that the data may be communicated over the hub network rather than the cradle network. The HSD/IoT data may be sent to the other hubs 510 in the other sections of the building over the hub network discussed previously, or over another hub network that is different than the hub network in arrangement 50. Additionally, the hub 510 may communicate the IoT data/HSD to client 560 and/or server(s) 304 via cloud 302. For sending data via the cloud 302, the hub 510 may package and/or encapsulate the HSD/IoT data according to a wired or wireless communication protocol, and transmit the packaged data over the channel 517. The channel 517 may be used to convey data over a suitable wired or wireless network, such as those discussed herein, and the wired/wireless communication protocol of channel 517 may different than the protocol used for the hub network and/or the cradle network. The packaged/encapsulated data may eventually be provided to the server(s) 304 and/or client 560 via the cloud 302.

Figure 6:
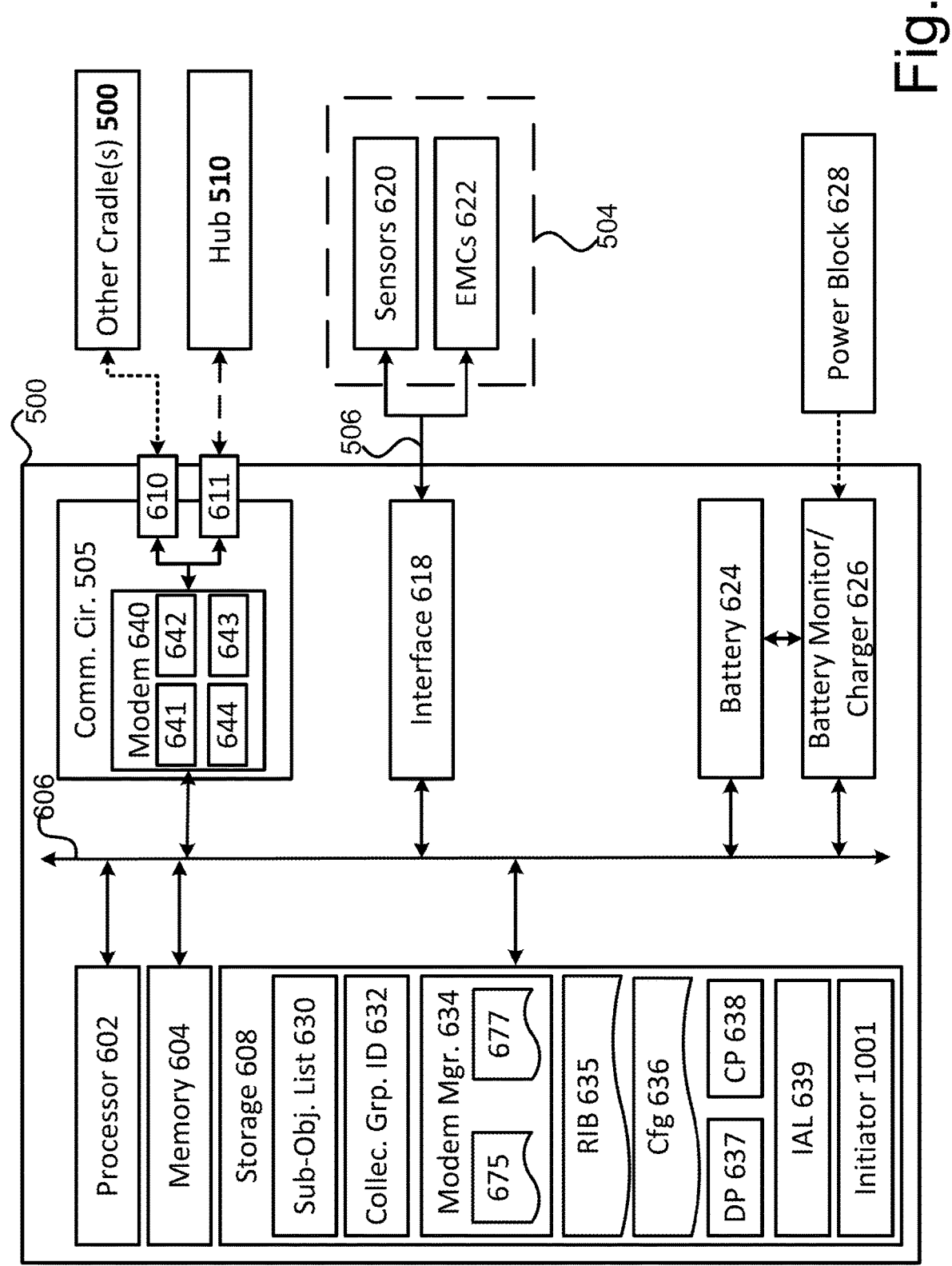
FIG. 6 illustrates an example implementation of a computing platform to be employed by a IoT device cradle, in accordance with various embodiments.

FIG. 6 illustrates the components of an example implementation of a cradle 500, in accordance with various embodiments. FIG. 6 shows a block diagram of an example of components that may be present in a cradle 500. The cradle 500 may include any combinations of the components shown in the example. The components may be implemented as ICs, portions thereof, discrete electronic devices, or other modules, logic, hardware, software, firmware, or a combination thereof adapted in the cradle 500, or as components otherwise incorporated within a chassis of a larger system. The block diagram of FIG. 6 is intended to show a high level view of components of the cradle 500. However, some of the components shown may be omitted, additional components may be present, and different arrangement of the components shown may occur in other implementations.

The cradle 500 may include a processor 602, which may be a microprocessor, a multi-core processor, a multithreaded processor, an ultra-low voltage processor, an embedded processor, or other known processing element. The processor 602 may be a part of a system on a chip (SoC) in which the processor 602 and other components are formed into a single integrated circuit, or a single package, such as the Edison™ or Galileo™ SoC boards from Intel. As an example, the processor 602 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 602 may communicate with a system memory 604 over the bus 606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 608 may also couple to the processor 602 via the bus 606. To enable a thinner and lighter system design the mass storage 608 may be implemented via a solid state disk drive (SSDD). Other devices that may be used for the mass storage 608 include flash memory cards, such as SD cards, microSD cards, xD picture cards, and the like, and USB flash drives. In low power implementations, the mass storage 608 may be on-die memory or registers associated with the processor 602. However, in some examples, the mass storage 608 may be implemented using a micro hard disk drive (HDD). Further, any number of new technologies may be used for the mass storage 608 in addition to, or instead of, the technologies described, such resistance change memories, phase change memories, holographic memories, or chemical memories, among others. For example, the cradle 500 may incorporate three-dimensional cross-point ("3D XPOINT") memories from Intel® and Micron®. In embodiments, the memory 604 and/or storage 608 may be divided into one or more trusted memory regions for storing applications or software modules for a secure or trusted execution environment. In some embodiments, the secure/trusted execution environment may comprise one or more secure enclaves defined using the Intel® SGX instructions, which is discussed in the commonly assigned and incorporated by reference Int'l App. No. PCT/US2016/037634 and the commonly assigned and incorporated by reference U.S. application Ser. No. 15/473,370. In some embodiments, the secure/trusted execution environment may comprise management engine (ME) circuitry, which may be an isolated and tamper-resistant chipset that is distinct from and generally operates independently of the processor 602. A detailed discussion of various ME circuitry implementations is discussed in detail in the commonly assigned and incorporated by reference Int'l App. No. PCT/US2016/037634 and the commonly assigned and incorporated by reference U.S. application Ser. No. 15/473,370. Additionally or alternatively, the secure/trusted execution environment may comprise a universal integrated circuit card (UICC), an embedded UICC (eUICC), or smartcard of the cradle 500 (not shown).

The mass storage 608 may include a number of modules to implement the group creation functions and/or mesh networking/fog computing functions described herein. Although shown as code blocks in the mass storage 608, it may be understood that any of the modules may be replaced with hardwired circuits, for example, built into a programmable device, such as an ASIC, SoC, field-programmable device (FPD), and the like. The FPD may comprise an FPGA or hardware accelerator; a programmable logic device (PLD) such as a complex PLD (CPLD), a high-capacity PLD (HCPLDs), and the like; a structured ASIC and the like; a programmable SoCs (PSoC); and/or other like devices. In embodiments where the cradle 500 includes hardware accelerators (e.g., FPGA cells) as well as processor cores, the hardware accelerators (e.g., the FPGA cells) may be pre-configured with the logic (e.g., with appropriate bit streams, logic blocks/fabric, etc.) to perform some functions of the various modules shown by storage 608 (in lieu of employment of programming instructions to be executed by the processor core(s) of processor 602). This may include, for example a (FPGA based) DP 637, a (FPGA based) CP 638, a (FPGA based) IAL 639, a (FPGA based) IoT device initiator 1001, a (FPGA based) modem manager 634, etc.

The mass storage 608 may include a sub-object list 630 of atomic objects and composite objects that may be used to form a group object, such as IoT group 306 discussed previously. A collection group identifier 632 may use the sub-object list 630 to generate a group ID, for example, using a hash formula on the sub-object list 630. The mass storage 608 may also include the modem manager 634, a routing information base (RIB) 636, data plane entity (DP) 637, the control plane entity (CP) 638, interface abstraction layer (IAL) 639, configuration(s) (CFG) 635, and protocol stack 800, IoT device initiator 1001. In some embodiments, the one or more of the aforementioned modules may be implemented in the secure/trusted execution environment in a same or similar manner as discussed in the commonly assigned and incorporated by reference Int'l App. No. PCT/US2016/037634 and U.S. application Ser. No. 15/473,370.

The modem manager 634 may configure the communication circuitry 505 to communicate using different wireless protocols. This may include detecting a trigger to reconfigure the communication circuitry 505, selecting a modem profile (MP) in response to the trigger, (re)configuring the communication circuitry 505 in accordance with the selected MP, etc. As shown, the modem manager 634 includes cradle profile 675 and hub profile 677. The cradle profile 675 may be an MP used to configure the communication circuitry 505 to communicate over the cradle network and the hub profile 677 may be an MP used to configure the communication circuitry 505 to communicate over the hub network.

Each MP may define a flow of digital signals through a digital circuit and logical operations performed on those signals. The digital signal flow and logical operations may be defined by or based on one or more protocol/network stack or other like implementation of a computer networking protocol suite and/or wireless communication protocol, such as those discussed herein. In some embodiments, the MPs may be or include a network access profile (NAP), which when enabled, may allow the cradle 500 to access a specific network infrastructure of a network or specific services provided by a service provider. A detailed description of NAP elements, provisioning, operations, etc. (including communication between two or more NAPs and between a NAP and a remote device) is discussed in the commonly assigned and incorporated by reference Int'l App. No. PCT/US2016/037634 and U.S. application Ser. No. 15/473,370. In embodiments where the modem 640 is implemented as an FPD, the MPs may be configured or otherwise defined using a hardware description language (HDL), such as register-transfer logic (RTL), very high speed integrated circuit (VHSIC) HDL (VHDL), Verilog, and the like. In embodiments, the MPs may be obtained from the server(s) 304 or hub 510 and stored locally in 608 (or a secure storage of the storage 608).

The MPs may be used to dynamically configure the communication circuitry 505 (or components therein). For example, the modem manager 634 may provision the communication circuitry 505 (or components therein) with a cradle profile 675, which when enabled by the communication circuitry 505 (or components therein), may allow the communication circuitry 505 to process digital signals of IoT data for transmission to other cradles 500, or process received signals from other cradles 500 to be provided to other components of the cradle 500 or to an attached IoT device 504.

The modem manager 634 may select an MP in accordance with one or more configurations 635, which may be device-specific or cradle-specific. The configuration(s) 635 may define a set of rules that govern the behavior of the cradle 500, which may include one or more conditions and/or criteria under which action(s) are executed. For example, the configuration(s) 635 may define one or more triggers (or events) to prompt the selection of a specific MP based on the type of data collected from one or more attached IoT devices 504. In another example, the configuration(s) 635 may define one or more triggers (or events) to prompt the selection of an MP based on an intended destination of collected data and an optimum route delineated by the RIB 636. In another example, the configuration(s) 635 may define actions to take when a failure occurs. Here, a failure may include situations where an MP is incorrectly or otherwise unable to be provisioned in the communication circuitry 505; receipt of a message from another component or attached IoT device 504 indicating an error/failure; when a radio link failure (RLF) is detected as indicated by the communication circuitry 505; when a subscription needs to be renewed or allocated credits for accessing a service fall below a threshold; when a threshold quality of service (QoS) level falls below a threshold; when a data rate or bandwidth allocation (e.g., as allocated to the cradle by a network element, or as defined by a data plan or network subscription) falls below a threshold; when a service provider is unreachable; and the like.

The RIB 636 may indicate routes for transmitting the IoT data and the HSD to individual cradles 500, the hub 510, and/or cradles and hubs in other environments (e.g., in another section of a building, etc.). In embodiments, the collection entities may perform lookup operations on the RIB 636 to determine the optimum routes for transmitting the IoT data/HSD to cradles 500 and/or hub 510. In embodiments, the RIB 636 may be formed as one or more database objects. In embodiments where the modules of FIG. 6 are replaced with hardwired circuits, the RIB 636 may be implemented as a Content Addressable Memory (CAM), Ternary CAM, associative cache memory, or some other associative memory device.

The routes indicated by the RIB 636 may be based on a physical distance between the cradle 500 and other cradles 500 and the hub 510, the communications capabilities of the cradle 500 (e.g., supported communication protocols, hardware platform including RF circuitry, etc.). The RIB 636 may store network addresses or identifiers of the other cradles 500, the hub 510, and/or IoT devices 504 attached to the other cradles. The network addresses/identifiers may be internet protocol (IP) addresses or some other unique identifier. In some embodiments, the RIB 636 may store the number of hops/nodes and/or identifiers of each hop/node for data to reach an intended destination. This may include next hop associations, which indicate that a particular destination can be optimally reached by sending data packets to a specific cradle 500 or hub 510 that represents a "next hop" or an address of a next node on the way to the intended destination. The RIB 636 may store interface information, which indicates a particular interface for reaching the next hop/node. This may include an address or identifier of a component within the cradle 500) and information for communicating the data to the next hop/node.

In one example, the interface information may indicate an address or identifier of communication circuitry 505 or modem 640 and an address/identifier of an MP to load into the modem 640 when the next node is another cradle 500 or hub 510. In another example, when the next node or final destination is an attached IoT device 504, the interface information may indicate an address or identifier of interface 618 and a connected port or pin(s) through which the IoT devices 504 is attached to the cradle 500. Furthermore, the RIB 636 may include a forwarding information based (FIB), which is used for packet forwarding. The RIB 636 may be built using any suitable hashing scheme, such as perfect hash function, cuckoo hash function, a jHash function, etc.

The interface abstraction layer (IAL) 639 may be an interface that unifies the communication between various applications (e.g., the app implemented by client 560 discussed previously) and the attached/coupled IoT devices 504. Typically, IoT device MFGs, vendors, service providers, etc. provide their own interfaces tailored to their suite of devices, and which may be independent of other IoT device interfaces provided by other MFGs, vendors, service providers, etc. The IAL 639 may provide a single interface or a consistent set of interfaces that allows users to access IoT devices 504 attached to cradles 500. In embodiments, the IAL 639 may obtain instructions or data from the collection entities 637-638 and convert the instructions/data into commands, parameters, messages, control signals, etc. for accessing data from the IoT devices 504 and/or controlling the IoT devices 504. For example, the IAL 639 may convert REST messages (or information contained therein) into inter-integrated circuit (I2C or VC) message(s) or signals for accessing/controlling the IoT devices 504. Other parameters, messages, control signals, etc. may be used to access/control the IoT devices 504 in other embodiments, such as Small Computer System Interface (SCSI) Parallel Interface (SPI) signals/messages, Joint Test Action Group (JTAG) protocol signals/messages, universal asynchronous receiver/transmitter (UART) protocol signals/messages, Musical Instrument Digital Interface (MIDI) protocol signals/messages, GSM/LTE attention (AT) commands, etc.

As discussed previously, the cradle 500 may implement one or more collection entities including the DP 637 and the CP 638. The collection entities may provide standard data access and control interface(s) for the attached IoT devices 504. In embodiments, the DP 637 may obtain IoT data from attached IoT devices 504 via the interface abstraction layer (IAL) 639, and may send IoT data obtained from another cradle 500 or hub 510 to one or more attached IoT devices 504 via the IAL 639. The IoT data obtained by the DP 637 may comprise measurement data generated by a particular sensor 620 and/or actuation data generated by a particular electromechanical component (EMC) 622. In one example, if one of the sensors 620 is a temperature sensor, the DP 637 may provide access to temperature data generated by that sensor 620. In another example, if one of the EMCs 622 is an elctromechanical lock, the DP 637 may provide access to state data at particular times/dates (e.g., locked at 10:00 AM on Sep. 1, 2017 by user1, unlocked at 10:05 AM on Sep. 1, 2017 by user2) and/or position and/or orientation data (e.g., position of a bolt/latch, orientation of a cylinder/lock body, etc.) generated by that EMC 622.

Similarly, the CP 638 may obtain HSD from attached IoT devices 504 via the IAL 639, and may send HSD obtained from another cradle 500 or hub 510 to one or more attached IoT devices 504 via the IAL 639. These entities may control the communication circuitry 505 to communicate the IoT data and HSD to other cradles 500 and/or hub 510. The HSD obtained by the CP 638 may comprise control data generated by a particular sensor 620 and/or a particular EMC 622. In one example, if one of the sensors 620 is a temperature sensor, the CP 638 may provide access to the temperature sensor itself, components of the temperature sensor, and/or the physical connections to the temperature sensor, which may allow a user (e.g., client 560) to ensure proper functioning of the temperature sensor. In another example, if one of the EMCs 622 is an elctromechanical lock, the CP 638 may provide access to the elctromechanical lock itself, such that a user may control or manipulate a lock state (e.g., engaging the bolt/latch of the lock, etc.) and/or alter a position and/or orientation of one or more components of the elctromechanical lock (e.g., alter a position of the bolt/latch, alter an orientation of the cylinder/lock body, etc.), depending on the capabilities of that EMC 622.

It should be noted that the data obtained and communicated by the DP 637 and the CP 638 are not limited to specific sensors 620 and/or EMCs 622 provided by specific MFGs, vendors, service providers, etc. Instead, the collection entities may identify the attached or connected sensors 620 and/or EMCs 622, determine a sensor/EMC type of sensor 620 and/or EMC 622 that is attached or connected, isolate the data plane and control plane activities for that sensor 620 and/or EMC 622 based on the sensor/EMC type, understand/determine the different types of data generated by individual attached/coupled IoT devices 504 and passed through the IAL 639, understand the differences between the different types of data generated by individual attached/coupled IoT devices 504, and physically interface with the attached IoT devices 504 via the IAL 639 to ensure proper operation of the attached/coupled IoT devices 504. In this way, individual sensors 620/EMCs 622 may provide universal access to various IoT devices 504 and allow various IoT devices 504 to be interchanged or switched out without having to alter or reconfigure the network architecture, physical systems, and/or communication protocols/procedures.

In some embodiments, the entities 637/638/639 may be implemented as application programming interfaces (APIs) to provide access to the IoT data/HSD of attached/coupled IoT devices 504. In such embodiments, the entities 637/638/639 may provide methods or procedure calls, which may be called by different components (e.g., hardware devices such as client 560, server(s) 304, one or more IoT devices 504, hub 510, etc.; virtualized devices; protocol entities/layers; applications; drivers/plugins, etc.). In response to such methods or procedure calls, the entities 637/638/639 may communicate data to/from various attached/coupled IoT devices 504 and to/from other cradles 500 and/or hub 510.

In some embodiments, each of the entities 637/638/639 may be implemented as a connector to provide access to the IoT data/HSD of attached IoT devices 504. When implemented as connectors, each of the entities 637/638/639 may be responsible for routing messages to/from different components or layers, as well as translating or formatting the messages for consumption by the other components/layers. In such embodiments, the collection entities 637-638 may encapsulate IoT data/HSD obtained from the IAL 639 for communication over the cradle network or the hub network, and may (de)encapsulate and/or translate IoT data/HSD obtained from the communication circuitry 505 for communication over the interconnect 506 to attached/coupled IoT devices 504 via IAL 639. In some implementations, the entities 637/638/639 may be exogenous connectors, which coordinate and control a totality of interactions/communications among various components/layers. In such implementations, the components/layers may not invoke method or procedure calls via the entities 637/638/639; rather, the entities 637/638/639 may perform the method or procedure calls on behalf of a requesting/calling component/layer. Additionally or alternatively, the collection entities may be type of middleware or "software glue," which is used to connect two or more separate components/layers by translating or adapting instructions/commands obtained from one component/layer into instructions/commands that can be understood by another component/layer.

In some embodiments, each of the entities 637/638/639 may provide a publisher and subscriber (pub/sub) service to provide access to the IoT data/HSD of attached IoT devices 504. In these embodiments, a particular component/layer may act as a subscriber and/or a publisher. The publishers and subscribers may communicate with one another using topic-based (or service-based) messages, wherein the publishers may be associated with one or more topics and may send the topic-based messages to subscribers that subscribe to the topics. In such implementations, each of the entities 637/638/639 may evaluate the IoT data/HSD from attached/coupled IoT devices 504 and may evaluate and filter the data according to various topics. Additionally, publishers may send IoT data/HSD generated by different IoT devices 504 to different types of subscribers, but the publishers may be responsible for enforcing policies/configurations regarding the types of devices that are allowed to subscribe to a particular topic. This may provide the ability to add topics that capture a different sets of data for new functions/services/features using currently installed IoT devices 504 and/or data provided by newly added IoT devices 504 without requiring alteration of the underlying network architecture, communication protocols, etc.

In one example, with reference to FIG. 5, the cradle 500-3 may subscribe to a temperature control topic for one or more attached IoT devices 504-3 and the cradle 500-2 may subscribe to a home security topic for one or more attached IoT devices 504-2. The cradle 500-1 may be a publisher of both the temperature control and home security topics based on one or more attached IoT devices 504-1 (e.g., a temperature sensor 620 and a pressure sensor 620). Based on events or triggers defined by device-specific CFGs 635, the collection entities 637-638 of the publisher cradle 500-1 may query or poll the attached IoT device(s) 504-1 for the topic-related data (e.g., polling/querying the temperature sensor for temperature data for the temperature control topic and polling/querying the pressure sensor 620 for pressure data for the home security topic). Additionally or alternatively, the collection entities 637-638 of the publisher cradle 500-1 may be subscribers to one or more attached IoT devices 504-1 that act as temperature-related publishers (e.g., the temperature sensor 620) and/or home-security-related publishers (e.g., the pressure sensor 620). The cradle 500-1 acting as a publisher may then provide the home security-related data to the subscribing cradle 500-2, and may provide the home security-related data to the subscribing cradle 500-2.

Figure 10:
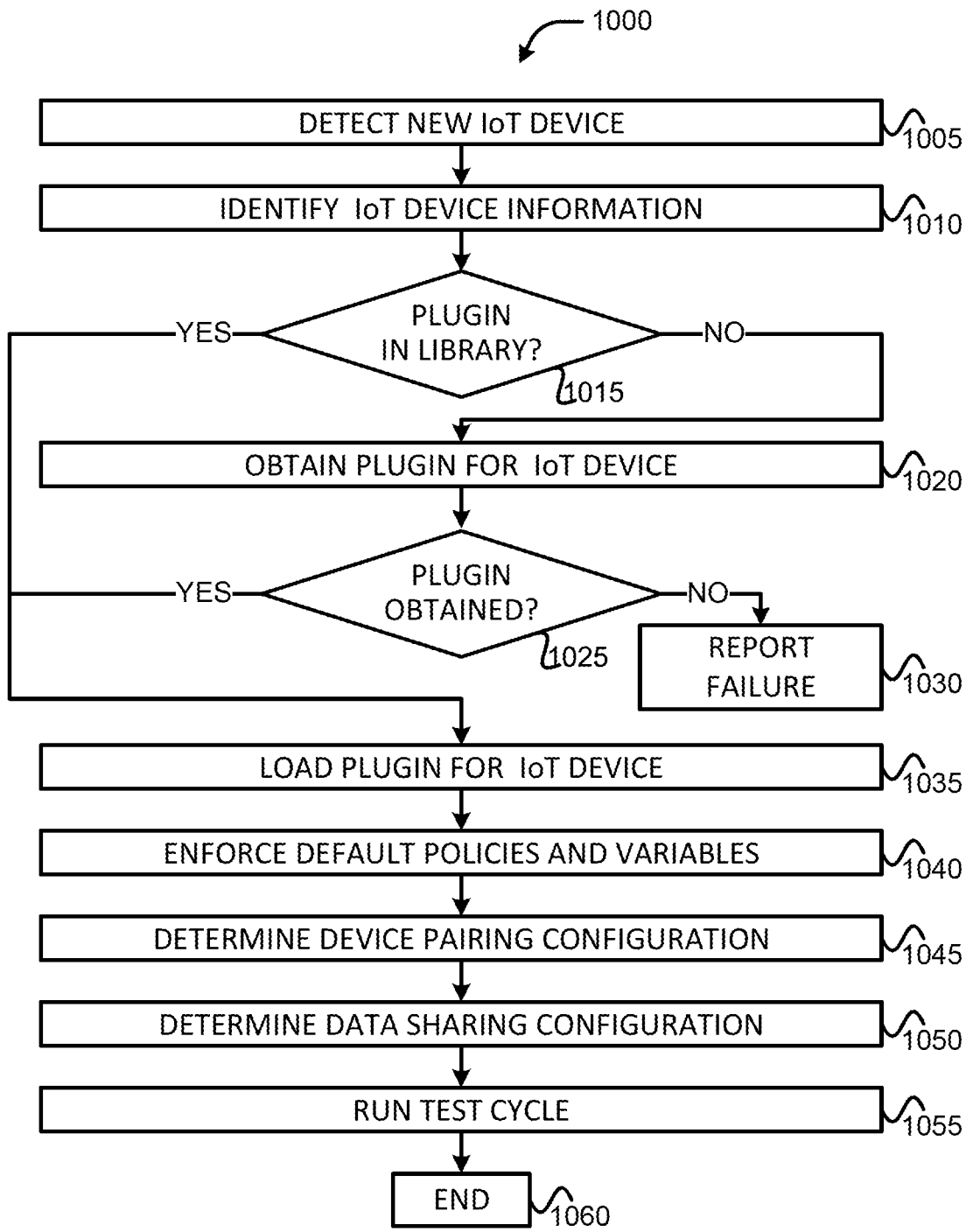
FIG. 10 illustrates an example process for initiating a new IoT device, in accordance with various embodiments.

The IoT device initiator 1001 (also referred to as "initiator 1001" and the like) may be used to perform an IoT device initiation procedure, such as the procedure depicted by FIG. 10. The initiator 1001 may be used to detect and pair the cradle 500 with IoT devices 504 that are newly attached/connected to the cradle 500. For example, the cradle 500 may invoke and operate the initiator 1001 when an IoT device 504 is attached/connected to an empty cradle 500 that is newly deployed in an environment, when a new IoT device 504 is added to an already paired cradle 500, when an IoT device 504 is replaced with a new IoT device 504, etc. Details of the procedures/operations performed by IoT device initiator 1001 are shown and described with regard to FIG. 10.

The bus 606 may couple the processor 602 to the modem circuitry 640 (also referred to as "baseband circuitry 640", "modem 640", and the like) for communications with other devices. The modem 640 may include circuitry such as, but not limited to, one or more FPDs such as FPGAs and the like; PLDs such as CPLDs, HCPLDs, and the like; ASICs such as structured ASICs and the like; PSoCs; etc. The circuitry of modem 640 may comprise logic blocks or logic fabric including, but not limited to, configuration logic 641, update logic 642, memory cells 643, input/output (I/O) blocks 644, and other interconnected resources that may be programmed to perform various modem functions, such as processing signals received from a receive signal path of the transceivers 610, 611, and generating signals for a transmit signal path of the transceivers 610, 611. Modem 640 may interface with the application circuitry of the cradle 500 for generation and processing of the signals and for controlling operations of the transceivers 610, 611.

For example, in various embodiments, the circuitry of the modem 640 may be provisioned with an MP by the modem manager 634. As discussed previously, the MP may be configured or otherwise defined using an HDL, such as RTL, VHDL, Verilog, and the like. The provisioning may include the MP being loaded into the memory cells 643 by the modem manager 634. The memory cells 643 may be used to store data in lookup-tables (LUTs) that are used by the modem 640 to implement various logic functions. Memory cells 643 may include any combination of suitable volatile memory and/or non-volatile memory including any combination of various levels of memory/storage including, but not limited to, erasable programmable read-only memory (EPROM), electrically erasable programmable read-only memory (EEPROM), flash memory, static memory (e.g., static random access memory (SRAM), anti-fuses, etc.

The provisioning may also include the update logic 642 obtaining the MP from the memory cells 643, and applying the MP to the configuration logic 641. Once the MP is enabled, the configuration logic 641 may define a set of signal paths and a set of logical operations to be performed on the signal paths, which may be used to handle various radio control functions that enable communication with one or more radio networks via the transceivers 610, 611 according to one or more particular wireless communications protocols. The radio control functions may include, but are not limited to, signal modulation/demodulation, encoding/decoding, radio frequency shifting, implementing protocol stacks, and the like. In some embodiments, modulation/demodulation by the modem 640 may include Fast-Fourier Transform (FFT), precoding, and/or constellation mapping/demapping functionality. In some embodiments, encoding/decoding circuitry of the modem 640 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. The modem 640 may pass demodulated signals obtained from the transceivers 610, 611 to other components of the cradle 500, and may pass modulated signals to the transceivers 610, 611 for transmission to other devices.

The cradle transceiver 610 (also referred to as a "mesh transceiver", "fog transceiver", etc.) may be used for communications with other cradles 500, which may be included in a fog and/or mesh network as discussed previously. The cradle transceiver 610 may use any number of frequencies and protocols. For example, when the modem 640 is configured with a cradle profile 675 that indicates the IEEE 802.15.4 standard, the cradle transceiver 610 may transmit/receive signals in the 2.4 gigahertz (GHz) range as specified by the IEEE 802.15.4 standard. Upon detection of a trigger, the modem 640 may be configured to utilize other wireless communications protocols for communicating with other cradles 500 and/or other mesh/fog devices, such as the Bluetooth® low energy (BLE) standard, as defined by the Bluetooth® Special Interest Group, or the ZigBee® standard, among others. The modem 640 may be configured for any particular wireless communications protocol for the connections to the other cradles 500 and/or other mesh/fog devices. For example, a cradle profile 675 may be used to implement Wi-Fi™ communications over a WLAN in accordance with the Institute of Electrical and Electronics Engineers (IEEE) 802.11 standard. In addition, wireless wide area communications, for example, according to a cellular or other wireless wide area protocol, can occur via a wireless wide area network (WWAN) cradle profile 675 or via a specific cellular network cradle profile 675.

The cradle transceiver 610 may include multiple radios (e.g., including hardware devices such as switches, filters, amplifiers, antenna elements, and the like to facilitate the communications over the air) to communicate using multiple standards for communications at different range. For example, the IoT devices 504 may communicate with close devices (e.g., within about 10 meters) using a local transceiver based on BLE, or another low power radio, to save power. More distant other cradles 500 and/or other mesh/fog devices (e.g., within about 50 meters) may be reached over ZigBee or other intermediate power radios. Both communications techniques may take place over a single radio at different power levels, or may take place over separate transceivers/radios, for example, a local transceiver/radio using BLE and a separate mesh transceiver/radio using ZigBee. Utilizing different wireless communications protocols may or may not include utilizing different radios within the cradle transceiver 610. The cradle transceiver 610 may be incorporated into an MCU as an address directly accessible by the chip, such as in the Curie® units available from Intel.

A hub transceiver 611 (also referred to as a "cloud transceiver", etc.) may include one or more radios to communicate with hub 510 and/or devices in the cloud 302. For example, when the modem 640 is configured with a hub profile 677 that indicates use of the IEEE 802.15.4 or IEEE 802.15.4g standards, among others, the hub transceiver 611 may transmit/receive signals in the 2.4 GHz range as specified by the IEEE 802.15.4/g standards to access a LPWAN. Upon detection of a trigger, the modem 640 may be configured to utilize other wireless communications protocols for communicating over the cloud 302, such as LoRaWAN™ (Long Range Wide Area Network) developed by Semtech and the LoRa Alliance, one or more WiFi protocols, and/or one or more cellular protocols discussed herein. Utilizing different wireless communications protocols may or may not include utilizing different radios within the hub transceiver 611. The techniques described herein are not limited to these technologies, but may be used with any number of other hub transceiver 611 that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the cradle transceiver 610 and hub transceiver 611, as described herein. For example, the radio transceivers 610 and 611 may include an LTE or other cellular transceiver that uses spread spectrum (SPA/SAS) communications for implementing high speed communications, such as for video transfers. Further, any number of other protocols may be used, such as Wi-Fi® networks for medium speed communications, such as still pictures, sensor readings, and provision of network communications.

The transceivers 610 and 611 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release (Rel-) 8 (Pre-4th Generation), 3GPP Rel-9 through 3GPP Rel-18, 3GPP Fifth Generation (5G), 3GPP New Radio (NR) systems, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), WiFi (IEEE 802.11 standard), Zigbee®, Bluetooth® or Bluetooth Low Energy (BLE), IEEE 802.15.4 (6LoWPAN), WiFi-direct, ANT or ANT+; LTE device-to-device (D2D) or Proximity Services (ProSe); Z-Wave (also known as "Zig-Wave"); Linear; SigFox; Platanus; Universal Plug and Play (UPnP), IEEE 802.16 or Worldwide Interoperability for Microwave Access (WiMAX), Wireless Gigabit Alliance (WiGig) standard, mmWave standards in general (wireless systems operating at 10-300 GHz and above such as WiGig, IEEE 802.11ad, IEEE 802.11ay, etc.), technologies operating above, 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems, and the like. In addition to the standards listed above, any number of satellite uplink technologies may be used for the uplink transceiver 611, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The bus 606 may couple the processor 602 to an interface 618, which may be any suitable hardware device(s) that is/are used to connect the cradle 500 external devices. The external devices may include IoT devices 504. The IoT devices may include one or more sensors 620 and/or one or more EMCs 622. Sensors 620 may be any device that is capable of detecting an event and/or changes in a surrounding environment. The sensors 620 may include accelerometers, level sensors, flow sensors, temperature sensors, pressure sensors, barometric pressure sensors, motion sensors, position/proximity sensors, and the like. The EMCs 622 may allow an IoT device 504 to change a state, position, and/or orientation, or move or control a mechanism or system. The EMCs 622 may include one or more power switches, actuators (e.g., valve actuators), an audible sound generator, a visual warning device, motors, wheels, thrusters, propellers, claws, clamps, hooks, and/or other like electro-mechanical components.

In embodiments, the cradle 500 may be configured to operate one or more EMCs 622 based on one or more captured events and/or instructions, commands, control signals, etc. The events may be based on policies/rules defined by the CFG 635, data collected from one or more sensors 620, and/or instructions, commands, control signals, etc. received from the hub 510, server(s) 304, and/or client 560. In embodiments, the IAL 639 may provide parameters, messages, control signals, etc. based on the sensor data and/or received instructions commands, etc. to the interface 618. In response, the interface 618 may perform general-purpose input/output (GPIO) operations to access resources of the IoT devices 504. In embodiments, the interface 618 may be capable of directly accessing the IoT devices 504 using suitable technologies, such as those discussed with regard to bus 606 infra. In some embodiments, the interface 618 may access or control a suitable relay module or I/O controller, such as an RS-232/485 relay module, a USB relay, an Ethernet relay, a programmable compute board (e.g., Arduino board, Intel® Edison board, Raspberry Pi board, etc.) programmed as a relay module, and the like. In embodiments, the interface 618, sensors 620, and EMCs 622 may be collectively referred to as "event capture circuitry." In some embodiments, the event capture circuitry may also battery monitor/charger 626, the processor 602, and/or other components in or coupled with platform 504.

A battery 624 may power the cradle 500, although in examples in which the IoT devices 504 is mounted in a fixed location, it may have a power supply coupled to an electrical grid. The battery 624 may be a lithium ion battery, a metal-air battery, such as a zinc-air battery, an aluminum-air battery, a lithium-air battery, and the like.

A battery monitor/charger 626 may be included in the IoT devices 504 to track the state of charge (SoCh) of the battery 820. The battery monitor/charger 626 may be used to monitor other parameters of the battery 624 to provide failure predictions, such as the state of health (SoH) and the state of function (SoF) of the battery 624. The battery monitor/charger 626 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 626 may communicate the information on the battery 624 to the processor 602 over the bus 606. The battery monitor/charger 626 may also include an analog-to-digital (ADC) convertor that allows the processor 602 to directly monitor the voltage of the battery 624 or the current flow from the battery 624. The battery parameters may be used to determine actions that the IoT devices 504 may perform, such as transmission frequency, mesh network operation, sensing frequency, and the like.

A power block 628, or other power supply coupled to a grid, may be coupled with the battery monitor/charger 626 to charge the battery 624. In some examples, the power block 628 may be replaced with a wireless power receiver to obtain the power wirelessly, for example, through a loop antenna in the IoT devices 504. A wireless battery charging circuit, such as an LTC4020 chip from Linear Technologies of Milpitas, Calif., among others, may be included in the battery monitor/charger 626. The specific charging circuits chosen depend on the size of the battery 624, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The components of cradle 500 may communicate over the bus 606. The bus 606 may include any number of technologies, including industry standard architecture (ISA), extended ISA (EISA), peripheral component interconnect (PCI), peripheral component interconnect extended (PCIx), PCI express (PCIe), or any number of other technologies. The bus 606 may be a proprietary bus, for example, used in a SoC based system. Other bus systems may be included, such as an I$^2$C interface, an SPI interface, point to point interfaces, and a power bus, among others.

While not shown, various input/output (I/O) devices may be present within, or connected to, the cradle 500. For example, a display may be included to show information, such as sensor readings or actuator position. An input device, such as a touch screen or keypad may be included to accept input. In another example, near-field communication (NFC) circuitry comprising an NFC controller coupled with an antenna element and a processing device may be included to read electronic tags and/or connect with another NFC-enabled device.

Figure 7:
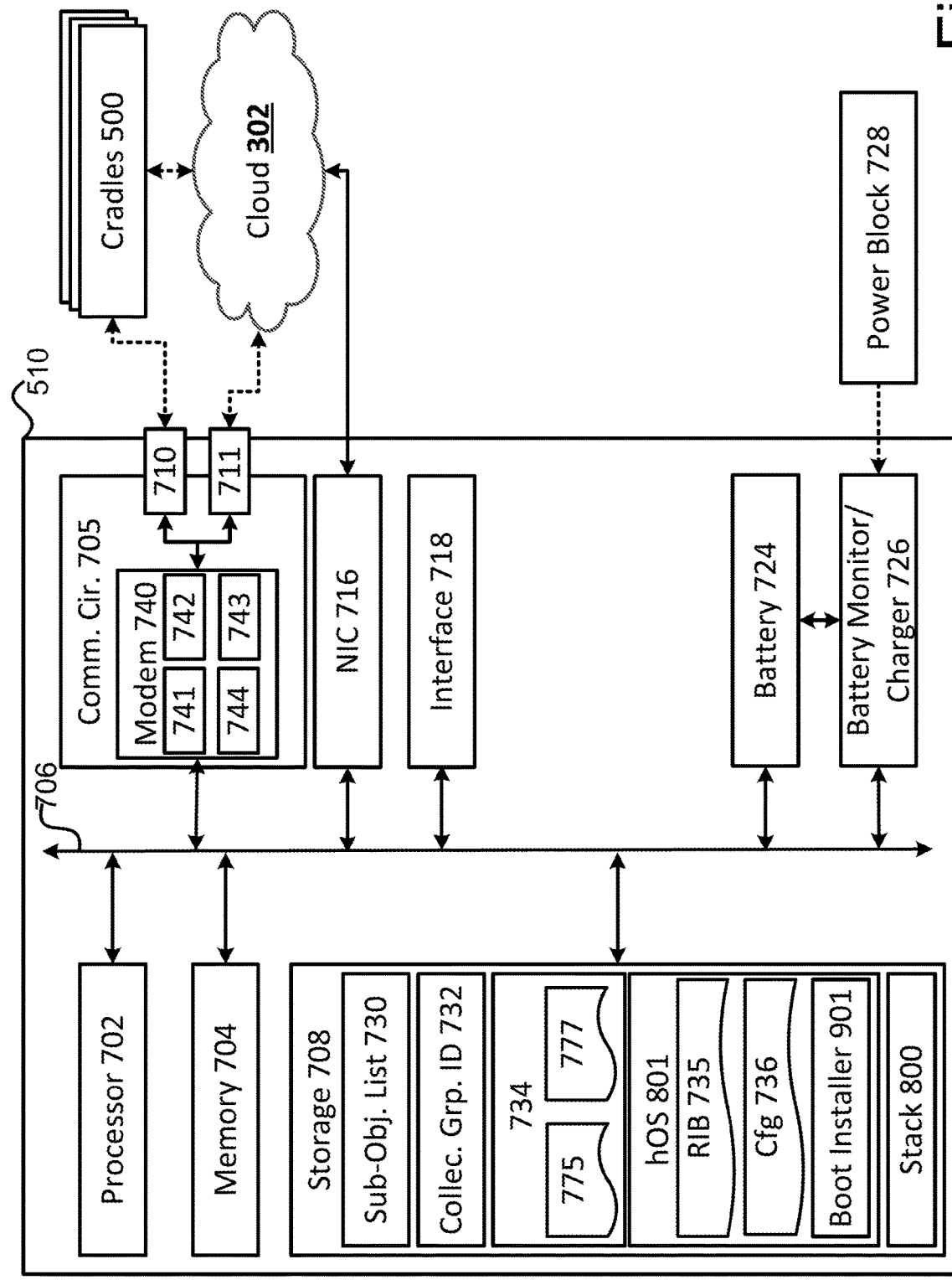
FIG. 7 illustrates an example implementation of a computing platform to be employed by a IoT device hub, in accordance with various embodiments.

FIG. 7 illustrates the components of an example implementation of the hub 510, in accordance with various embodiments. As shown by FIG. 7, the hub 510 may include similar components as shown by FIG. 6, wherein similarly numbered elements may designate like parts throughout. For example, processor 702 may be the same or similar as processor 602, memory 704 may be the same or similar as memory 604, bus 606, interface 718 may be the same or similar as interface 618, storage 708 may be the same or similar as storage 608, battery 724 may be the same or similar as battery 624, and battery monitor 726 may be the same or similar as battery monitor 626, power block 728 may be the same or similar as power block 628, etc. Each of these elements may operate in a same or similar manner as the similarly numbered elements discussed with regard to FIG. 6. Although not shown by FIG. 7, the mass storage 708 may include the same or similar modules/entities that are shown FIG. 6 (e.g., RIB 636, collection entities 637-638, IAL 639, etc.), which may operate in a same or similar manner as discussed previously. For the sake of brevity, the elements that differ from those shown and described by FIG. 6 are discussed infra.

The hub 510 may include communication circuitry 705, which may be the same or similar as the communication circuitry 505 discussed previously. In this regard, the modem circuitry 740 and transceivers 710-711 may be the same or similar as the modem circuitry 640 and transceivers 610-611, respectively. However, in some embodiments, the modem circuitry 740 and transceiver 710 may allow the hub 510 to communicate with various cradles 500 over multiple channels using different wireless communication protocols. In such embodiments, the cradle transceiver 710 may include multiple radios (e.g., including hardware devices such as switches, filters, amplifiers, antenna elements, and the like to facilitate the communications over the air) to communicate using multiple standards for communications. For example, the cradle transceiver 710 may include a first radio for communicating with a first cradle 500 (e.g., cradle 500-1 shown by FIG. 5) using BLE, a second radio for communicating with a second cradle 500 (e.g., cradle 500-2 shown by FIG. 5) using ZigBee, and so forth. To do so, the communication circuitry 505 may include multiple modems 740 in order communicate with multiple cradles 500 simultaneously, if necessary, or the modem manager 734 may operate a suitable scheduling algorithm allowing the hub 510 to switch MPs that are loaded and enabled by modem 740.

A network interface controller (NIC) 716 may be included to provide a wired communication to the cloud 302 or to other devices, such as the other cradles 500 and/or other devices. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 716 may be included to allow connect to a second network, for example, a NIC 716 providing communications to the cloud over Ethernet, and a second NIC 716 providing communications to other devices over another type of network.

The storage 708 may include program code for a hub operating system (hOS) 801, configurations (CFGs) 735, RIB 736, protocol stack 800, and boot installer 901. The hOS 801 may be included to perform operations for various components of the hub 510, manage hub resources by controlling and allocating memory, prioritizing system requests and processes, controlling I/O devices, managing file systems, etc. The hOS 801 may provide access to the various cradles 500 and force policies/configurations on the cradles 500. This is described in more detail with regard to FIG. 8. The hOS 801 may support real-time operations, such as operations of protocol stack 800 (see e.g., FIG. 8). The hOS 801 may also support operations of various applications, which may be on a non-real-time basis. The hOS 801 may be any suitable operating system or firmware, such as a real-time operating system (RTOS), a router OS or network OS that is tailored for network switches or commercial routers, a general purpose OS, or the hOS 801 may be a proprietary OS specifically written for and tailored to the hub 510.

The RIB 736 may indicate routes for transmitting IoT data and HSD to individual cradles 500, entities or devices (e.g., server(s) 304, client 560, network elements in cloud 302, etc.), and/or cradles 500 and hubs 510 in other environments (e.g., in federated networks and/or in another section of a building, etc.). The RIB 636 may be the same or similar (or have a same or similar format) as the RIB 636 discussed previously. However, in some embodiments, the RIB 736 may be a master or global RIB, which stores routes for all of the cradles 500 in the environment 50 (see FIG. 5), as well as routing information for sending data to external entities/devices. Additionally, the collection entities of the hub 510 may perform lookup operations on the RIB 736 to determine the optimum routes for transmitting the IoT data/HSD to cradles 500, external entities/devices, and/or cradles 500 and hubs 510 in other environments.

The CFGs 735 may comprise documents or data structures in a format that can be interpreted and rendered by the hub 510, such as XML (or any variation thereof), JSON, markdown (or any variation thereof), IFTTT ("If This Then That"), PADS markup language (PADS/ML), routing policy language (RPL), Click router configuration language, Nettle, and/or some other suitable data format. In embodiments, the documents or data structures may be generated by an application implemented by a user device (e.g., client 560) based on various selections within a user interface.

The documents or data structures of the CFCs 735 may comprise a "description," which is collections of software modules, program code, logic blocks, parameters, policies, rules, etc. that may be used by one or more cradles 500 to control and/or monitor various IoT devices 504, as well as share data generated by the IoT devices 504. The description may indicate relevant information to be implemented by one or more cradles 500 and/or integrated into one or more IoT devices 504. For example, the description may indicate information to be implemented in or by specific types of IoT devices 504, implemented in or by cradles 500 or IoT devices 504 deployed at specific locations, and/or the like. In some embodiments, the description may comprise information for an individual cradle 500 or IoT device 504 to generate device-specific configurations 635 and/or executable software modules or software components. In such embodiments, when the CFGs 735 are implemented by a cradle 500 and/or IoT devices 504, the cradle 500 and/or the IoT devices 504 may generate executable code for execution in a corresponding runtime environment (RTE) that enables the cradle 500 and/or IoT devices 504 to interpret data generated by sensors 620 and/or EMCs 622, and control sensors 620 and/or EMCs 622 according to the device-specific CFGs 635. In embodiments where the cradles 500 and/or IoT devices 504 are implemented as field-programmable devices (FPDs) such as FPGAs, structured ASICs, programmable SoCs (PSoCs), etc., the CFGs 735 may be configured or otherwise defined using a hardware description language (HDL), such as register-transfer logic (RTL), very high speed integrated circuit (VHSIC) HDL (VHDL), Verilog, and the like.

The boot installer 901 (also referred to as an "installer", "installation engine", and the like) may be used to perform base installation or boot procedure for newly installed cradles 500. Boot installer 901 may be invoked and operated by the hub 510 when a cradle 500 is first installed or newly deployed in an environment, such as when a construction contractor installs various cradles 500 throughout one or more new buildings or when a cradle 500 is installed in existing home/office locations. In addition, boot installer 901 may be invoked and operated when IoT devices 504 have not yet been attached or coupled with the newly deployed cradle 500 or an empty cradle 500. As used herein, the term "empty cradle 500" may refer to a cradle 500 without attached IoT devices 504. Details of the procedures/operations performed by boot installer 901 are shown and described with regard to FIG. 9.

The protocol stack 800 may be an implementation of various protocols used to communicate data between a user device (e.g., client 560) and the IoT devices 504 via the hub 510 and cradles 500. The stack 800 may include various protocols, preferences, configurations, etc. for preparing and providing data for consumption by a user device, and preparing and providing data for consumption by various IoT devices 504. Details of protocol stack 800 are discussed in more detail with regard to FIG. 8.

Figure 8:
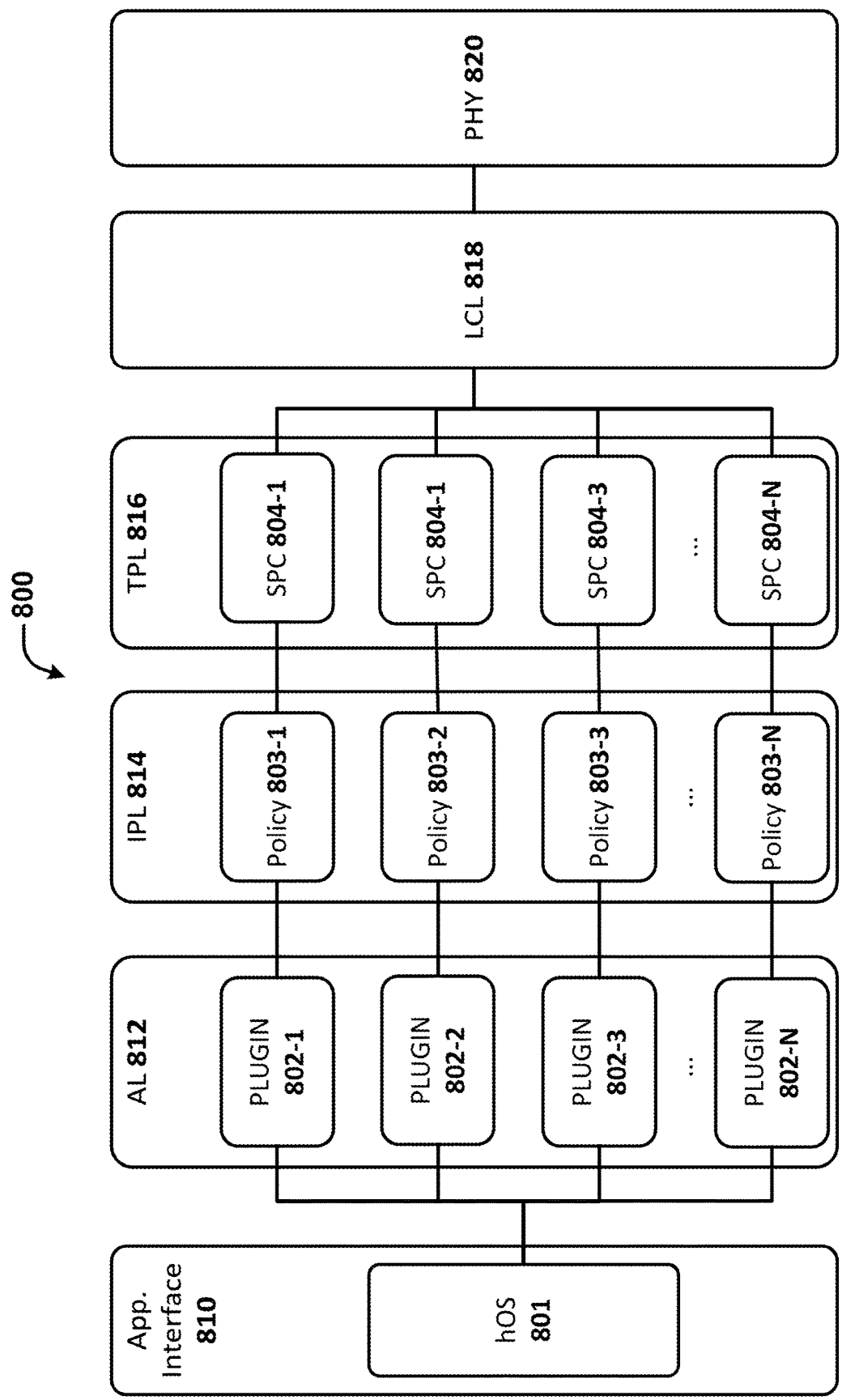
FIG. 8 illustrates an example protocol stack, in accordance with various embodiments.

FIG. 8 depicts an example protocol stack 800, in accordance with various embodiments. The protocol stack 800 may be used for establishing mesh networking and/or fog computing functionality among the hub 510, cradles 500, and user devices (e.g., client 560 shown and described with respect to FIG. 5). As shown, the stack 800 may include an application interface 810 including the hOS 801, an application layer (AL) 812, an internet protocol layer (IPL) 814, a transfer protocol layer (TPL) 816, a link control layer (LCL) 818, and a physical layer (PHY) 820.

The application interface 810 may provide an interface through which a user may access and/or interact with the hub 510 in order to access the cradles 500 and/or IoT devices 504. As shown, the application interface 810 may include the hOS 801. In embodiments, the hOS 801 may be used to host a user application (e.g., the previously discussed "app") for accessing the hub 510 and resources provided by individual IoT devices 504 and/or cradles 500, as well as resources provided by various IoT groups (e.g., IoT group 306 and the like). Through the hOS 801 and/or by hosting the app, the application interface 810 may also allow the user to view the IoT devices 504 within the network; the locations of IoT devices 504 within the network; a status, availability, or mode of operation of the IoT devices 504 in the network; and/or other analytics associated with the IoT devices 504. The hOS 801 may host the app to enable the user of the user device to define various configurations for obtaining services provided by the various IoT devices 504. In some embodiments, the application interface 810 may only be implemented by the hub 510.

The AL 812 may provide interfaces for cradles 500 and/or IoT devices 504 to present information to the user via the application interface of the app. The AL 812 may be a layer responsible for packaging or formatting data obtained from the IoT devices 504 for presentation to the user, and for packaging/formatting data obtained from the user application for consumption by the IoT devices 504. The AL 812 may be implemented as libraries, APIs, etc., which allow application developers, vendors, MFGs, service providers, etc. to use desired ones of the various software modules and/or software components of the libraries, APIs, etc. such that their applications may interact with hardware elements of the hub 510. In embodiments, each IoT device 504 may have a corresponding plugin 802-1 to 802-N (collectively referred to as "plugins 802") within the AL 812, which may describe the computations, parameters, actions, etc. required to present the data obtained from corresponding IoT devices 504 to the user and for providing data by the user to corresponding IoT devices 504. The plugins 802 may be defined and/or generated using the any of the programming languages and/or development tools discussed herein.

The IPL 814 may be responsible for packet routing and interworking among different networks (e.g., cloud 302, hub network, cradle network, etc.). This may include identification and addressing of data packets to be routed from a source to destination. In embodiments, each IoT device 504 may have a corresponding policy 803-1 to 803-N (collectively referred to as "policies 803" or "policy configurations 803") within the IPL 814, which may describe policies, rules, capabilities, etc. for each corresponding IoT device 504. In one example, the policies 803 may indicate, for individual IoT devices 504, which types of data (e.g., IoT data or HSD, or certain portions of IoT data or HSD) may be shared with various types of IoT devices 504 (e.g., a type of sensor 620 or type of EMC 622) and/or specific IoT devices 504 (e.g., IoT devices 504 deployed at a specified location and the like). In another example, the policies 803 may indicate IoT devices 504 and client devices 560 that are permitted to access the IoT data and HSD or other hardware resources of the corresponding IoT devices 504. In another example, the policies 803 may indicate IoT device capabilities, such as a hardware and/or software platform, versions of various software components, communication capabilities, etc. The policies 803 may be based on the configurations defined by the user using the various interfaces provided by the application interface 810 and/or hOS 801. The policies 803 may be formed of any of the programming languages, markup languages, schema languages, etc. discussed herein. The sharing of data may be based on permissions set for various IoT devices 504 and/or capabilities of the IoT devices 504. In embodiments, the IPL 814 may comprise a policy layer (not shown by FIG. 8) to enforce policies 803 for corresponding IoT devices 504 to which the individual cradles 504 are communicatively attached.

The TPL 816 may be responsible for sharing data and providing flow control functionality for data being communicated between a user device and IoT devices 504. The TPL 816 may include interfaces for indicating the current status, preferences, and configuration sets (SPCs) 804-1 to 804-N (collectively referred to as "SPCs 804") for individual IoT devices 504. The TPL 816 may determine or identify, based on HSD and/or IoT data obtained from the physical layer 820, a status of individual IoT devices 504, current preferences of individual IoT devices 504, and current configurations of individual IoT devices 504. Once identified, the SPCs 804 may be generated by the TPL 816 and provided to higher and/or lower layers of the stack 800. The status of the SPCs 804 may indicate a current state or mode of operation of individual IoT devices 504. The preferences of the SPCs 804 may indicate data that individual IoT devices 504 want or need to perform various functions. The configurations of the SPCs 804 may indicate the current settings of the individual IoT devices 504.

The LCL 818 may provide interfaces between higher/upper layers and lower layers. The LCL 818 may provide traffic flow management and error control functionality, and identify communication protocols to be used for communicating data among the hub 510, cloud 302, and the various IoT devices 504 via respective cradles 500. In this regard, the LCL 818 may establish a flow for protocol data units (PDUs) (e.g., frames, packets, etc.) to be communicated among the various devices by defining or assigning flow parameters to a flow. The flow parameters may include flow category (e.g., network control, remote computing/programming, emergency, voice, data monitoring, logging, etc.), flow priority, quality of service (QoS) parameters, network type (e.g., protocols used for hub network, cradle network, cloud 302, etc.), traffic type (e.g., permanent or switch traffic), data type of the flow (e.g., IoT data or HSD), and the like. In embodiments, the LCL 818 may assign flow parameters to a flow based on the data type to be communicated among individual IoT devices 504, hub 510, client 560, etc. In this regard, the LCL 818 may be responsible for identifying the data type of an individual flow and determining the flow parameters associated with the data type. The LCL 818 may also assign sequence numbers to PDUs. In embodiments, the LCL 818 may include a QoS sublayer (not shown by FIG. 8) to identify and mark PDUs according to their QoS requirements and assign interrupts to high priority data. In embodiments, the LCL 818 may assign sequence numbers and flow parameters to the PDUs based on the operations to be performed by one or more IoT devices 504, priorities associated with the traffic or IoT devices 504, and/or other criteria that may be defined by policies 803.

The PHY 820 may comprise the hardware infrastructure (e.g., communication circuitry 705, NIC 716, etc.) for transmitting the data in the cradle network, the hub network, and/or the cloud 302, as well as providing interfaces (e.g., APIs) between the protocol stack 800 and the drivers/plugins 802 for the platform of the hub 510 or cradle 500. The main functions of the PHY 820 may include transmitting/receiving (e.g., raw bits of data) over various air or wired interfaces (e.g., physical links, such as, links 508, 511, 517, etc.), performing link adaptation, power control, loading modem configurations (e.g., switching between hub and cradle networks), and the like. The PHY 820 may also indicate to higher layers how corresponding IoT devices 504 are connected or attached to individual cradles 500, the specific technologies used by the various IoT devices 504 to connect to the network, how are the various IoT devices 504 are powered, and/or other like information. In embodiments, the PHY 820 may communicate IoT data and HSD obtained from individual cradles 500 with other individual cradles 500 over the hub network, may provide IoT data/HSD to the client device 560 via the LCL 818, the TPL 816, IPL 814, the AL 812, and the application interface 810 and hOS 801, and may obtain data to be provided to individual IoT devices 504 via the application interface 810 and hOS 801, the AL 812, the IPL 814, the TPL 816, and the LCL 818.

In embodiments, protocol stack 800 may be implemented by the hub 510, which may be used for communicating IoT data and HSD between the hub 510 and client 560/server(s) 304 directly or via cloud 302. The protocol stack 800 implemented by the DP 737 and/or CP 738 may also be used for communicating IoT data and HSD between hub 510 and client 560 (and/or servers 304), which may be done via direct links or via cloud 302. In some embodiments, protocol stack 800 without the application interface 810 may be implemented by the DP 637 and/or CP 638 of cradles 500, which may be used for communicating IoT data and HSD between the IoT devices 504 and cradles 500 to which they are attached, as well as communicating IoT data and HSD among the cradles 500 over various air interfaces.

FIGS. 9-12 illustrate processes 900-1200 for provisioning and implementing the modem manager 634 in accordance with various embodiments. For illustrative purposes, the operations of processes 900-1200 are described as being performed by the various elements as described with respect to FIGS. 1-8. Some of the operations in processes 900-1200 are described as being between hub 510, one or more cradles 500, IoT devices 504, and other components/modules of arrangement 50, such as cloud 302, server(s) 304, client 560, and the like. It should be understood that such communications between the components/modules/devices may be facilitated by the communication circuitry 505/705 as described with regard to FIGS. 5-8. Moreover, while particular examples and orders of operations are illustrated in FIGS. 9-12, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring to the figures, FIG. 9 is a flowchart illustrating an example process 900 for base installation or a boot procedure, in accordance with various embodiments. For illustrative purposes, the operations of processes 900 are described as being performed by the boot installer 901 of the hub 510 with an empty cradle 500. However, it should be understood that the process 900 may be performed with cradles 500 with attached IoT devices 504 (e.g., "non-empty cradles 500") and/or other like devices. In embodiments, the boot installer 901 may be program code stored in one or more computer-readable media (e.g., storage 708), which when executed by processor circuitry (e.g., processor 702), may cause the hub 510 to perform the operations of process 900. In embodiments where the boot installer 1001 is implemented as a hardware accelerator (e.g., FPGA cells), the boot installer 901 (e.g., the FPGA cell(s)) may be pre-configured with the logic (e.g., with appropriate bit streams, logic blocks/fabric, etc.) to perform the operations of process 900 (in lieu of employment of programming instructions to be executed by the processor 702).

Process 900 may begin at operation 905 where boot installer 901 causes the hub 510 to enter a pairing mode with the empty cradle 500. This may take place when the hub 510 and/or the empty cradle 500 are powered on. Any suitable pairing mechanism may be used at operation 905, such as exchanging capability information via pairing request and pairing response messages, generating and exchanging keys or digital certificates (e.g., using Elliptic Curve cryptography Key Agreement algorithm (ECKA), Elliptic Curve Diffie Hellman (ECDH) public key cryptography algorithm, and/or other like key exchange algorithms), synchronizing audio and/or visual patterns, and the like. User interaction mechanisms, such as compare and confirm, copy and confirm, choose and enter, button enabled device authentication (BEDA), and other like approaches requiring user involvement may be used to pair the devices.

At operation 910, boot installer 901 may obtain a unique identifier (ID) of the cradle 500. In some embodiments, the communication circuitry 705 of the hub 510 may receive a capabilities message from the empty cradle 500, which includes the unique ID and other capability information of the empty cradle 500.

At operation 915, boot installer 901 may instruct the communication circuitry 705 to establish an end-to-end encrypted tunnel (EET) with the empty cradle 500. The EET may be a secure channel used to transfer data between the cradle 500 and the hub 510 in a manner that is resistant to overhearing the data and/or tampering with the data. The EET may be established using known procedures/protocols, such as using digital signatures, public key infrastructure, and the like. The keys and/or digital signatures used to establish the EET may be provisioned in the cradle 500 and/or hub 510 during manufacture of those devices, or may be remotely provisioned in the cradle 500 and/or hub 510. Example implementations and procedures for such remote provisioning are discussed in the commonly assigned and incorporated by reference Int'l App. No. PCT/US2016/037634. Furthermore, in various embodiments, operations 905-915 may be combined into a single process or procedure.

At operation 920, the boot installer 901 determines/identifies cradle capabilities of the empty cradle 500. The cradle capabilities may be based on the capabilities information exchanged during the pairing procedure of operation 905. Cradle capabilities may include various platform and/or runtime environment parameters associated with the cradle 500, such as hardware components implemented in the cradle 500 (e.g., processor type and model, memory devices, RF chipset, etc.), particular communication protocols that are supported by the cradle 500, installed OS, firmware, etc. types and versions, device identifier, etc.

At operation 925, the boot installer 901 determines whether the empty cradle 500 needs any updates. In embodiments, the updates may be based on the cradle capabilities identified at operation 920. If at operation 925 the boot installer 901 determines that the empty cradle 500 needs updates, then the boot installer 901 may proceed to operation 930 to obtain the required updates and provision those updates in the empty cradle 500 via the EET. In one example, the boot installer 901 may identify a version of currently installed firmware at operation 925, and if the identified version is not a most-up-to-date version, the boot installer 901 may schedule the cradle 500 for firmware updates at operation 930. After updating the empty cradle 500, the boot installer 901 may proceed to operation 935 to determine routes between the empty cradle 500 and the hub 510.

If at operation 925 the boot installer 901 determines that the empty cradle 500 does not need any updates, then the boot installer 901 may proceed to operation 935 to determine one or more communication routes from the empty cradle 500 to the hub 510. In embodiments, the boot installer 901 may gauge a distance between the hub 510 and the empty cradle 500 in order to find best or most optimum route to the empty cradle 500 with minimum numbers of hops/next nodes. In various embodiments, the boot installer 901 may use any suitable routing protocol to determine the communication routes, such as a distance-vector routing protocol (e.g., Routing Information Protocol (RIP), Enhanced Interior Gateway Routing Protocol (EIGRP), Babel, etc.), a path vector protocol (e.g., Border Gateway Protocol (BGP), etc.), a link-state routing protocol (e.g., Open Shortest Path First (OSPF), intermediate system to intermediate system (IS-IS), etc.), and/or the like.

At operation 940, the boot installer 901 may generate an RIB (e.g., RIB 636) for the empty cradle 500 based on the routes determined/identified at operation 935, and provision the generated RIB 636 in the empty cradle 500 via the EET. At operation 945, the boot installer 901 may determine whether any IoT devices 504 connected to the cradle 500 need a sensor initiation. If at operation 945 the boot installer 901 determines that no IoT devices 504 need a sensor initiation, then the boot installer 901 may proceed to operation 955 to determine if there are any remaining unpaired cradles 500 that need to be paired with the hub 510. If at operation 945 the boot installer 901 determines there is at least one connected IoT device 504 that needs IoT device initiation, then the boot installer 901 may proceed to operation 950 to activate the IoT device initiator 1001 and/or to invoke performance of the IoT device initiation procedure 1000, which is shown and described by FIG. 10. During or after performance of procedure 1000, the boot installer 901 may proceed to operation 955 to determine whether there are any remaining unpaired cradles 500.

At operation 955, the boot installer 901 may determine if there are any unpaired cradles 500 that need to be paired with hub 510. If at operation 955 boot installer 901 determines that there is at least one unpaired cradles 500 remaining, then the boot installer 901 may loop back to perform operation 905. If at operation 955 the boot installer 901 determines that there are no unpaired cradles 500 remaining, then the boot installer 901 may proceed to operation 960 to end process 900. After operation 960, the process 900 may be invoked at some point in the future and repeated as necessary.

Referring now to FIG. 10, which is a flowchart illustrating an example process 1000 for initiating a new IoT device 504, in accordance with various embodiments. Process 1000 may operate concurrently with, or after completion of process 900 of FIG. 9. For illustrative purposes, the operations of process 1000 are described as being performed by the initiator 1001 of a cradle 500 with a newly attached IoT device 504. In embodiments, the initiator 1001 may be program code stored in one or more computer-readable media (e.g., storage 608), which when executed by processor circuitry (e.g., processor 602), may cause the cradle 500 to perform the operations of process 1000. In embodiments where the initiator 1001 is implemented as a hardware accelerator (e.g., FPGA cells), the initiator 1001 (e.g., the FPGA cell(s)) may be pre-configured with the logic (e.g., with appropriate bit streams, logic blocks/fabric, etc.) to perform the operations of process 1000 (in lieu of employment of programming instructions to be executed by the processor 602).

Process 1000 may begin at operation 1005 where IAL 639 of cradle 500 may detect a new IoT device that is connected or attached to the cradle 500. In embodiments, the initiator 1001 may implement the IAL 639 to interact with the interface 619 to detect a (digital or analog) signal or voltage being produced by the new IoT device 504 over the interconnect 506 when the new IoT device 504 is powered on or during some point in time during operation of the new IoT device 504. In other embodiments, the new IoT device 504 may wirelessly broadcast an indicator, which may be received by the communication circuitry 505, and the initiator 1001 may implement a data collection entity to obtain the indicator from the communication circuitry 505. Other methods for detecting the new IoT device 504 may be used in other embodiments.

At operation 1010, the initiator 1001 may identify information related to the new IoT device 504 (also referred to as "IoT device information", "IoT information", and the like). The IoT information may indicate a unique ID of the IoT device 504, a device type of the IoT device 504 (e.g., a type of sensor or EMC), a MFG or vendor of the IoT device 504, a model of the IoT device 504, and various capabilities of the IoT device 504, such as communication capabilities of the IoT device 504 (e.g., supported communication protocols, versions of such protocols, etc.), hardware and/or software platforms implemented by the IoT device 504, resources provided by the IoT device 504, etc.

At operation 1015, the initiator 1001 may determine whether a plugin 802 is currently available for the new IoT device 504. In some embodiments, the initiator 1001 may check whether the plugin 802 for the new IoT device 504 is stored in a local storage 608. In other embodiments, the initiator 1001 may instruct the communication circuitry 505 to communicate the IoT information to the hub 510, and receive an indication from the hub 510 of whether the hub 510 currently includes the plugin 802.

If at operation 1015 the initiator 1001 determines that a plugin 802 is currently available for the new IoT device 504, then initiator 1001 may proceed to operation 1035 to load the plugin for the new IoT device 504. If at operation 1015 the initiator 1001 determines that a plugin 802 is not currently available for the new IoT device 504, then the initiator 1001 may proceed to operation 1020 to obtain the plugin 802 for the new IoT device 504. In embodiments, the plugin 802 may be obtained from the hub 510, which may have obtained the plugin 802 via cloud 302. In other embodiments, operation 1015 may include obtaining an indication from hub 510 indicating that the hub 510 has obtained and installed the plugin 802 for the new IoT device 504.

At operation 1025, the initiator 1001 may determine whether the plugin 802 was properly obtained. If at operation 1025 the initiator 1001 determines that the plugin 802 was not properly obtained, then the initiator 1001 may proceed to operation 1030 to report the failure to the hub 510, which may then be reported to the client 560 and/or server(s) 304. If at operation 1025 the initiator 1001 determines that the plugin 802 was properly obtained, then the initiator 1001 may proceed to operation 1035 to load the plugin 802 for the new IoT device 504. At operation 1035, the initiator 1001 may load the plugin 802 for the new IoT device 504. At operation 1040, the initiator 1001 may enforce default policies 803 and variables for the IoT device 504.

At operation 1045, the initiator 1001 may determine a device pairing configuration for the new IoT device 504. The device pairing configuration may indicate whether the new IoT device 504 is to be paired or operate in conjunction with one or more other IoT devices 504 to provide desired functionality/services. In embodiments, when two or more IoT devices 504 are paired, they may exchange HSD and/or IoT data with one another to perform the desired functions and/or provided the desired services. At operation 1050, the initiator 1001 may determine data sharing configurations for the IoT device 504. The data sharing configurations may indicate the other devices or types of devices, such as other IoT devices 504 or other computing devices, with which the new IoT device 504 may share its data including IoT data and/or HSD. In some embodiments, the pairing information and/or the device sharing information may be indicated by the capabilities information discussed previously. In other embodiments, the user may be prompted to input the device pairing configuration and/or the device sharing information through the app discussed previously.

At operation 1055, the initiator 1001 may run a test cycle for the IoT device 504 to determine is the IoT device 504 is operating properly and whether the cradle 500 is operating in accordance with the configurations/parameters set for the IoT device 504. In embodiments, the test cycle may be run by the new IoT device 504 and obtained values/data may be reported to the hub 510. This may be done to confirm proper installation and connectivity of the new IoT device 504. After completion of the test cycle, the initiator 1001 may proceed to operation 1060 to end process 1000 or the initiator 1001 may repeat process 1000 as necessary.

Figure 11:
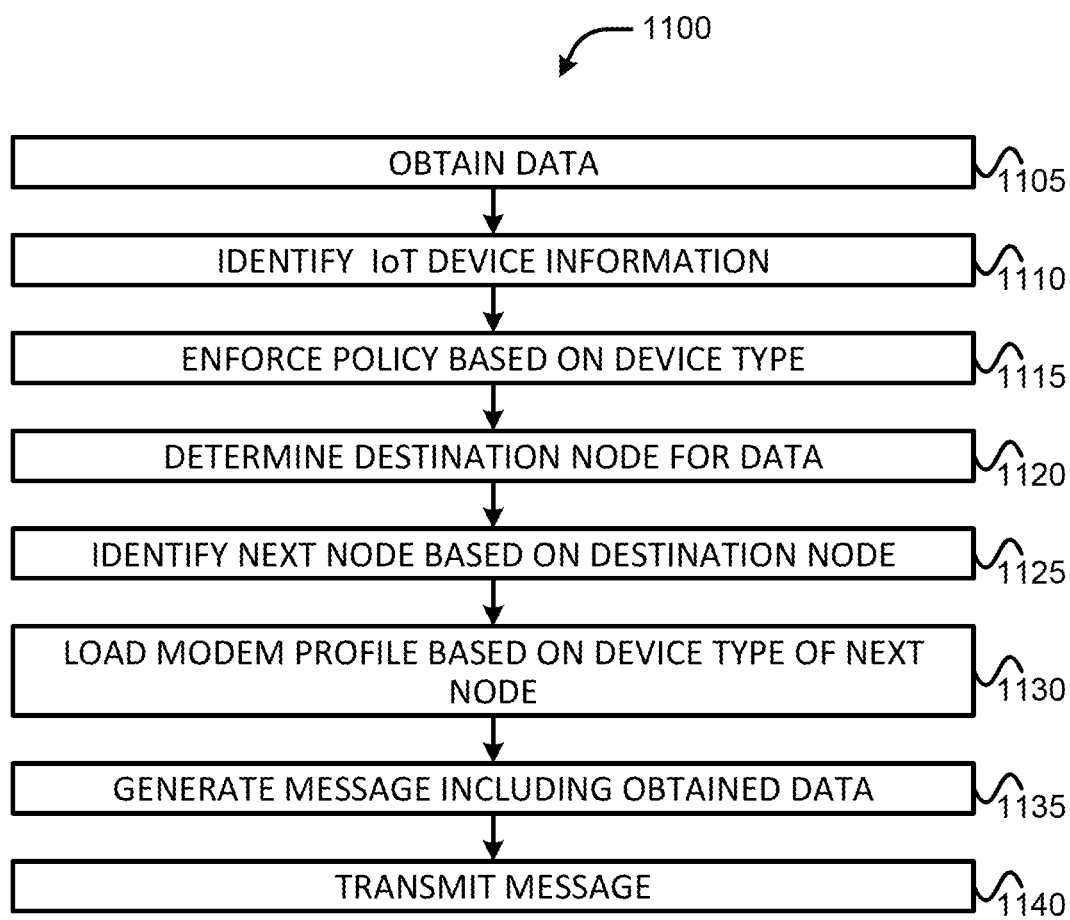
FIG. 11 illustrates an example process for communicating data in a mesh network or a fog computing system, in accordance with various embodiments.

Referring now to FIG. 11, which is a flowchart illustrating an example process 1100 for communicating data in a mesh network and/or fog computing system, in accordance with various embodiments. Process 1100 may be operated by the hub 510 and/or cradles 500 after completion of processes 900-1000 of FIGS. 9-10. For illustrative purposes, the operations of process 1000 are described as being performed by the various entities of hub 510 and/or a cradle 500 with an attached IoT device 504. In embodiments, the hub 510 and/or cradle 500 may include program code stored in one or more computer-readable media (e.g., storage 608/708), which when executed by processor circuitry (e.g., processor 602/702), may cause the hub 510 and/or cradle 500 to perform the operations of process 1100. In embodiments where the process 1100 is implemented as hardware accelerator(s) (e.g., FPGA cells), the hub 510 and/or cradle 500 (e.g., the FPGA cell(s)) may be pre-configured with logic (e.g., with appropriate bit streams, logic blocks/fabric, etc.) to perform the operations of process 1100 (in lieu of employment of programming instructions to be executed by the processor 602/702).

Process 1100 may begin at operation 1105 where data may be obtained from an attached IoT device 504, the hub 510, client 560/server(s) 304, etc. At operation 1110, IoT device information may be identified from the obtained data, which may indicate a device type, device ID, etc. of the IoT device 504 that generated the data. At operation 1115, a policy may be enforced based on the device type of the IoT device 504 that generated the data and/or other criteria. At operation 1120, the destination node may be determined for the data, and at operation 1125 a next node for transmitting the data may be determined based on the destination node. At operation 1130, an appropriate modem profile may be loaded into the communication circuitry 505/705 based on a device type of the next node. At operation 1135, a message may be generated to include the obtained data, and this message may also indicate the destination node and/or the next node. At operation 1140, the generated message may be transmitted to the next node.

In embodiments where process 1100 is operated by a cradle 500, process 1100 may operate according to the following example.

At operation 1105, data may be obtained from an attached IoT device 504 or the hub 510. To obtain the data from an attached IoT device 504, the IAL 639 may be activated to interact with the interface 618 to obtain the data over interconnect 506. To obtain the data from the hub 510, the communication circuitry 505 may be configured with an appropriate modem profile (e.g., hub profile 677) to obtain the data over a hub network. In embodiments, the IAL 639 or the communication circuitry 505 may determine whether the obtained data is HSD or IoT data.

If the obtained data is HSD, then the CP 638 may be activated to identify the IoT device information at operation 1110, and obtain and enforce a policy 803 corresponding to the IoT device 504 at operation 1115. If the obtained data is IoT data, then the DP 637 may be activated to identify the IoT device information at operation 1110, and obtain and enforce a policy 803 corresponding to the IoT device 504 at operation 1115. The policies 803 for the HSD and the IoT data may be indicated by a CFG 636 corresponding to the IoT device 504 (or device ID of the IoT device 504) that generated the data. In some cases, the policy 803 may indicate different preferences, permissions, etc. for HSD than for IoT data even if generated by the same IoT device 504, for example, the IoT data may be permitted to be shared with a sensor 620 and an EMC 622 while the HSD may only be permitted to be shared with the EMC 622.

At operation 1120 the DP 637 or CP 638 may determine a destination node for the IoT data or HSD. In embodiments, the destination node may be indicated by the IoT device information identified at operation 1110, indicated in packets (e.g., a destination field of a packet header) used to convey the data, based on information of the policy 803 and/or cfc 636, based on the data type of the obtained data (e.g., HSD or IoT data), etc. At operation 1125, the DP 637 or CP 638 may identify a next node based on the determined destination node. In embodiments, the DP 637 or CP 638 may perform a lookup operation on the locally stored RIB 635 for an address of the next node based on an identifier or address of the destination node. The lookup operation may include hashing the address/identifier of the destination or performing some other suitable operation.

At operation 1130, the DP 637 or CP 638 may instruct the modem manager 634 to load the cradle profile 675 or the hub profile 677 depending on whether the next node is a cradle 500 or a hub 510. If the next node is the hub 510, then the DP 637 or CP 638 may instruct the modem manager 634 to load the hub modem profile 677 into the modem 640 in order to communicate the data over the hub network. If the DP 637 or CP 638 determines that the next node is another cradle 500, then the DP 637 or CP 638 may instruct the modem manager 634 to load the cradle modem profile 675 into the modem 640 in order to communicate the data over the cradle network.

At operation 1135, the DP 637 or CP 638 may generate a message including the obtained data. For example, if the obtained data is IoT data then the DP 637 may generate the message including IoT data, and if the obtained data is HSD then the CP 638 may generate the message including IoT data. At operation 11140, the DP 637 or CP 638 may control transmission of the generated message to the next node by, for example, instructing the communication circuitry 505 to transmit the message in accordance with the wireless protocol of the modem profile loaded at operation 1130.

In embodiments where process 1100 is operated by a hub 510, process 1100 may operate according to the following examples.

At operation 1105, data may be obtained from a cradle 500 over the hub network or a client 560 (or server(s) 304) via cloud 302. In a first example the data is obtained from a cradle 500 and in a second example the data is obtained from a client 560.

First Example. When the data is obtained from a cradle 500, the data may have been generated by an attached IoT device 504. To obtain the data from the cradle 500, the communication circuitry 705 may be configured with an appropriate modem profile (e.g., hub profile 777) to obtain the data over the hub network. In embodiments, the PHY 820 may determine the data type of the obtained data (e.g., whether the data obtained from the cradle 500 is HSD or IoT data), and may provide the data to the LCL 818. In other embodiments, the PHY 820 may pass the data to the LCL 818, and the LCL 818 may determine whether the obtained data is HSD or IoT data.

Regardless of whether the PHY 820 or the LCL 818 determines the data type of the obtained data, at operation 1110 the LCL 818 may identify IoT device information of the data obtained from the cradle 500. In embodiments, the LCL 818 may establish a flow based on the identified IoT device information, and the TPL 816 may generate SPCs 804 to indicate information conveyed by the established flow. At operation 1115, the IPL 814 may be activated to identify, obtain, and enforce a policy 803 for HSD or IoT data corresponding to the IoT device 504 that generated the data obtained at operation 1105. The policies 803 for the HSD and/or the IoT data may be based on IoT device information identified at operation 1110. In embodiments, enforcement of the policies 803 may include restricting information from the SPCs 804 generated by the TPL 816 from being pushed to higher or lower layers At operation 1120, the IPL 814 may determine a destination node for the data. At operation 1125, the IPL 814 may identify a next node for transferring the data based on the determined destination node. In embodiments, the destination node may be indicated by the IoT device information identified at operation 1110, may be based on the policy 803, based on the data type (e.g., HSD or IoT data) of the obtained data, indicated in packets used to convey the data, etc.

The destination node may be a remote device (e.g., client 560 or server(s) 304) or another IoT device 504 attached to a cradle 500. When the destination is the client 560, the IPL 814 may provide the data to the AL 812 to be packaged/formatted for presentation to the user via the application interface 810 and/or the hOS 801. The data may be packaged/formatted according to a plugin 802 corresponding to the IoT device 500 that generated the data.

When the destination is the other IoT device 504, the IPL 814 may perform a lookup operation on an RIB 735 for an address of the next node based on an identifier or address of the destination node (e.g., by hashing the identifier or address). Additionally, the TPL 816 may generate a message to include the obtained data (or an SPC 804 based on the obtained data), the address/identifier of the next node, and the device type of the next node, which may take place at operation 1135. At operation 1130, the LCL 818 and/or the PHY 820 may instruct the modem manager 734 to load the appropriate modem profile (e.g., the hub profile 777 when the next node is a cradle 500) into the modem 740 in order to transmit the data over the hub network at operation 1140. In this example, operation 1135 may take place before, during, or after performance of operation 1130.

Second Example. When the data is obtained from the client 560 at operation 1105, the data may have been generated by a user of the client 560 using an app and may include or indicate a configuration 736. To obtain the data from the client 560, the communication circuitry 705 may be configured with an appropriate modem profile (e.g., a cloud profile) to obtain the data over a network associated with the cloud; or the data may be obtained by the NIC 716 using an appropriate wired communication protocol. In embodiments, the PHY 820 or the LCL 818 may determine that the data is obtained from the client 560.

At operation 1110 the LCL 818 may identify IoT device information of the obtained data. In this case, the IoT device information may be various parameters of the configuration 736. The LCL 818 may establish a flow based on the identified IoT device information, and the TPL 816 may generate SPCs 804 to indicate information conveyed by the established flow. At operation 1115, the IPL 814 may be activated to generate policies 803 for one or more IoT devices 504 based on the configuration 736, which may then be enforced by the IPL 814. Additionally, the IPL 814 may generate device-specific configurations 636 based on the configuration 736 and/or the generated policies 803.

At operation 1120, the IPL 814 may determine one or more destination nodes for the data and/or the device-specific configurations 636. At operation 1125, the IPL 814 may identify next nodes for conveying the data to the destination nodes in a same or similar manner as discussed previously. The TPL 816 may generate a message to include the device-specific configurations 636, the address/identifier of the next node, and the device type of the next node, which may take place at operation 1135. At operation 1130, the LCL 818 and/or the PHY 820 may instruct the modem manager 734 to load the appropriate modem profile (e.g., the hub profile 777) into the modem 740 in order to transmit the data over the hub network at operation 1140. In this example, operation 1135 may take place before, during, or after performance of operation 1130.

Some non-limiting examples are provided below.

Example 1 may include an apparatus to be employed as an Internet of Things (IoT) cradle, the apparatus comprising: an interface abstraction layer to communicate with one or more IoT devices to which the IoT cradle is communicatively attached via respective connections with the one or more IoT devices; communication circuitry to communicatively attach the IoT cradle with one or more other IoT cradles and a IoT hub; and one or more collection entities to: collect IoT data from the one or more IoT devices via the interface abstraction layer, and provide the collected IoT data to one or more other IoT cradles or the IoT hub via the communication circuitry; and collect hardware state data (HSD) from the one or more IoT devices via the interface abstraction layer, and provide the collected HSD to the one or more other IoT cradles or the IoT hub via the communication circuitry.

Example 2 may include the apparatus of example 1 and/or some other examples herein, wherein the one or more collection entities comprise a data plane entity and a control plane entity, and wherein: the data plane entity is to collect the IoT data from the one or more IoT devices via the interface abstraction layer, and provide the collected IoT data to one or more other IoT cradles or the IoT hub via the communication circuitry; and the control plane entity is to collect the HSD from the one or more IoT devices via the interface abstraction layer, and provide the collected HSD to the one or more other IoT cradles or the IoT hub via the communication circuitry.

Example 3 may include the apparatus of example 1 or 2 and/or some other examples herein, wherein the respective connections comprise wired connections between the one or more IoT devices and the IoT cradle, wireless radio links between the one or more IoT devices and the IoT cradle, or connections between the one or more IoT devices and the IoT cradle via one or more input/output (I/O) pins.

Example 4 may include the apparatus of example 1 or 2 and/or some other examples herein, wherein the communication circuitry is to communicatively attach the IoT cradle to the one or more other IoT cradles over a mesh network and communicatively attach the IoT cradle to the IoT hub over a wireless local area network (WLAN).

Example 5 may include the apparatus of example 1 or 2 and/or some other examples herein, wherein the communication circuitry is to communicatively attach the IoT cradle to the one or more other IoT cradles in a fog computing system and communicatively attach the IoT cradle to the IoT hub over a WLAN.

Example 6 may include the apparatus of example 4 or 5 and/or some other examples herein, wherein communication circuitry is to communicate in the mesh network or the fog computing system using a first wireless communication protocol and communicate in the WLAN using a second wireless communication protocol, wherein the first wireless communication protocol is different than the second wireless communication protocol.

Example 7 may include the apparatus of example 1 or 2 and/or some other examples herein, wherein the interface abstraction layer is to: detect a connection to a new IoT device connected with the IoT cradle; and obtain identifying information of the new IoT device, the identifying information comprising a device identifier (ID) of the new IoT device, a device type of the new IoT device, or a manufacturer or vendor of new IoT device.

Example 8 may include the apparatus of example 7 and/or some other examples herein, wherein the control plane entity is to control the communication circuitry to: transmit a first message including the identifying information to the IoT hub; and receive, from the IoT hub, a second message including data sharing permissions, wherein the data sharing permissions comprise device pairing information and user management information, wherein the device pairing information indicates one or more IoT devices that are permitted to obtain IoT data generated by the new IoT device and one or more IoT devices that are permitted to access hardware resources of the new IoT device, and wherein the user management information indicates one or more client devices that are permitted to obtain the IoT data generated by the new IoT device and one or more client devices that are permitted to access hardware resources of the new IoT device.

Example 9 may include the apparatus of example 2 and/or some other examples herein, further comprising an installation engine to implement an installation procedure to communicatively attach the IoT cradle with the IoT hub, wherein to implement the installation procedure, the installation engine is to: initialize a pairing mode, wherein the pairing mode is to be initialized when the IoT cradle is powered on or in response to receipt of an instruction to enter the pairing mode; broadcast a unique ID of the IoT cradle to the one or more other IoT cradles and the IoT hub; establish an end-to-end encrypted tunnel with the IoT hub in response to receipt of a message from the IoT hub based on the unique ID; and control the communication circuitry to transmit, to the IoT hub over the end-to-end encrypted tunnel, a cradle capabilities message indicating a platform of the IoT cradle, one or more supported communications protocols, and identifying information of the one or more IoT devices attached to the IoT cradle, wherein the identifying information of each of the one or more IoT devices comprises a device ID, a device type, and a IoT device manufacturer or vendor.

Example 10 may include the apparatus of example 9 and/or some other examples herein, wherein the installation engine is to control the communication circuitry to: receive, from the IoT hub over the end-to-end encrypted tunnel, a routing information base (RIB), wherein the RIB indicates routes for transmission of the IoT data and the HSD to individual IoT cradles of the one or more other IoT cradles and routes for transmission of the IoT data and the HSD to the IoT hub, wherein the data plane entity is to provide, via the communication circuitry, the collected IoT data to the individual IoT cradles or the IoT hub according to the routes indicated by the RIB, and wherein the control plane entity is to provide, via the communication circuitry, the collected HSD to the individual IoT cradles or the IoT hub according to the routes indicated by the RIB.

Example 11 may include the apparatus of any one of examples 1-10 and/or some other examples herein, wherein the communication circuitry comprises configurable modem circuitry, wherein the configurable modem circuitry comprises a field-programmable gate array (FPGA), a programmable logic device (PLD), a complex PLD (CPLD), a high-capacity PLD (HCPLD), an application-specific integrated circuit (ASIC), a structured ASIC, or a programmable system on chip (PSoC).

Example 12 may include the apparatus of example 11 and/or some other examples herein, wherein the apparatus further comprises a modem manager to load, into the configurable modem circuitry, a first modem profile for communicating over the IoT data or the HSD over a first network and a second modem profile for communicating over the IoT data or the HSD over a second network, wherein the one or more collection entities are to instruct the modem manager to load the first modem profile or the second modem profile into the configurable modem circuitry.

Example 13 may include the apparatus of example 11 and/or some other examples herein, wherein the one or more IoT devices comprise one or more sensors or one or more electromechanical devices.

Example 14 may include an apparatus to be employed as an Internet of Things (IoT) hub in a mesh network or a fog computing environment, the apparatus comprising: a physical layer to communicate IoT data and/or hardware state data (HSD) with individual IoT cradles over a first network, and communicate the IoT data and/or the HSD with a client device over a second network, according to policy configurations of the individual IoT devices, wherein the individual IoT cradles obtain the IoT data and the HSD from individual IoT devices to which they are communicatively attached, and wherein the IoT data indicates data associated with an event detected by the individual IoT devices, and the HSD is to facilitate access to hardware resources of the individual IoT devices; a policy layer to enforce policy configurations of the individual IoT cradles, wherein the policy configurations indicate devices that are permitted to access the IoT data or the HSD.

Example 15 may include the apparatus of example 14 and/or some other examples herein, wherein the apparatus further comprises an application interface to: host an application (app) comprising one or more interfaces through which the client device is to access the hardware resources of individual IoT devices, and one or more interfaces through with the client device is to define the policy configurations to be enforced by the policy layer.

Example 16 may include the apparatus of example 15 and/or some other examples herein, wherein the apparatus further comprises an application layer (AL), the AL to: host individual plugins corresponding to the individual IoT devices, wherein the individual plugins indicate parameters for presenting IoT data and the HSD to the app and parameters for providing user data to the individual IoT devices, wherein the user data is obtained from the app via the application interface.

Example 17 may include the apparatus of example 16 and/or some other examples herein, wherein the apparatus further comprises an internet protocol layer (IPL) comprising the policy layer, the IPL to: package the IoT data and the HSD for delivery to the AL; and package the user data obtained from app for delivery to the individual IoT devices via the individual IoT cradles.

Example 18 may include the apparatus of example 17 and/or some other examples herein, wherein the apparatus further comprises a transfer protocol layer (TPL) to: provide flow control functionality for the IoT data and the HSD communicated between the client device and the one or more IoT devices according to the policies enforced by the policy layer; determine, based on the HSD or the IoT data, a current status of individual IoT devices, current preferences of individual IoT devices, and current configurations of individual IoT devices; generate status, preference, and configuration sets (SPCs) for the for individual IoT devices; and provide the generated SPCs to the IPL.

Example 19 may include the apparatus of example 18 and/or some other examples herein, wherein the apparatus further comprises a link control layer (LCL) to: establish a flow for protocol data units (PDUs) of the HSD or the IoT data; assign flow parameters to the established flow based on a data type of the flow, wherein the data type indicates whether packets of the flow convey the HSD or the IoT data, and wherein the flow parameters comprise a flow category of the flow, a flow priority of the flow, quality of service (QoS) parameters for the HSD or IoT data, a network type to be used to communicate the HSD or IoT data, a traffic type for the flow, and the data type of the flow.

Example 20 may include the apparatus of example 19 and/or some other examples herein, wherein the physical layer is to: indicate to the LCL, the TPL, the IPL, or the AL physical information, wherein the physical information comprises attachment information indicating how the individual IoT devices are communicatively attached to the individual IoT cradles, and power informating indicating how are the individual IoT devices are powered.

Example 21. The apparatus of any one of examples 14-20 and/or some other examples herein, wherein the first network comprises a first communication protocol and the second network comprises a second communication protocol, wherein the first communication protocol is different than the second communication protocol.

Example 22 may include the apparatus of example 21 and/or some other examples herein, wherein the apparatus further comprises communication circuitry to implement the physical layer, wherein the communication circuitry comprises a first transceiver to communicate the IoT data and/or the HSD over the first network in accordance with the first communication protocol and a second transceiver to communicate the IoT data and/or the HSD over the second network in accordance with the second communication protocol, and wherein the first communication protocol and the second communication protocol are different wireless communication protocols.

Example 23 may include the apparatus of example 21 and/or some other examples herein, wherein the apparatus further comprises communication circuitry and network interface circuitry (NIC) to implement the physical layer, wherein the communication circuitry comprises a transceiver to communicate the IoT data and/or the HSD over the first network in accordance with the first communication protocol and the NIC is to communicate the IoT data and/or the HSD over the second network in accordance with the second communication protocol, wherein the first communication protocol a wireless communication protocol and the second communication protocol is a wired communication protocol.

Example 24 may include the apparatus of example 21 and/or some other examples herein, wherein the communication circuitry comprises configurable modem circuitry, and the apparatus further comprises: a modem manager to load, into the configurable modem circuitry, a first modem profile for communicating over the IoT data or the HSD over a first network and a second modem profile for communicating over the IoT data or the HSD over a second network, wherein the one or more collection entities are to instruct the modem manager to load the first modem profile or the second modem profile into the configurable modem circuitry, and wherein the configurable modem circuitry is a field-programmable gate array (FPGA), a programmable logic device (PLD), a complex PLD (CPLD), a high-capacity PLD (HCPLD), an application-specific integrated circuit (ASIC), a structured ASIC, or a programmable system on chip (PSoC).

Example 25 may include the apparatus of example 24 and/or some other examples herein, wherein the one or more IoT devices comprise one or more sensors or one or more electromechanical devices.

Example 26 may include a method to be performed by an Internet of Things (IoT) cradle, the method comprising: collecting, by the IoT cradle via an interface abstraction layer, IoT data and/or hardware state data (HSD) from individual IoT devices communicatively attached to the IoT cradle; transmitting, by the IoT cradle, the collected IoT data and/or HSD to one or more other IoT cradles over a first network; and transmitting, by the IoT cradle, the collected IoT data and/or HSD to an IoT hub over a second network.

Example 27 may include the method of claim 26 and/or some other examples herein, wherein transmitting the collected IoT data and/or HSD to the one or more other IoT cradles comprises: operating a data plane entity to send the collected IoT data to the one or more other IoT cradles over the first network; and operating a control plane entity to send the collected HSD to the one or more other IoT cradles over the first network.

Example 28 may include the method of claim 27 and/or some other examples herein, wherein transmitting the collected IoT data and/or HSD to the IoT hub comprises: operating the data plane entity to send the collected IoT data to the IoT hub over the second network; and operating the control plane entity to send the collected HSD to the IoT hub over the second network.

Example 29 may include the method of claim 26 and/or some other examples herein, further comprising: identifying, by the IoT cradle, a policy for sending the collected IoT data and/or the HSD based on a configuration associated with the individual IoT devices; and enforcing, by the IoT cradle, the policy.

Example 30 may include the method of claim 29 and/or some other examples herein, wherein enforcing the policy comprises: identifying, by the IoT cradle, IoT devices indicated by the policy that are not permitted to obtain the collected IoT data or the collected HSD; and preventing transmission to IoT cradles of the one or more IoT cradles that are communicatively attached to the identified IoT devices.

Example 31 may include the method of claim 26 and/or some other examples herein, further comprising: determining, by the IoT cradle, a destination node to obtain the IoT data and/or the HSD; and determining, by the IoT cradle, a next node to transmit the IoT data and/or the HSD to be conveyed to the destination node.

Example 32 may include the method of claim 31 and/or some other examples herein, wherein determining the next node comprises: performing, by the IoT cradle, a lookup operation on a routing information base using an identifier of the destination node.

Example 33 may include the method of claim 32 and/or some other examples herein, wherein determining the destination node comprises: identifying, by the IoT cradle, a destination node identifier indicated by IoT device information, wherein the IoT device information is indicated by the IoT data and/or the HSD or the IoT device information is indicated by a configuration associated with the individual IoT devices.

Example 34. The method of any one of claims 26-28 and/or some other examples herein, wherein transmitting the collected IoT data and/or HSD to the one or more other IoT cradles comprises: configuring, by the IoT cradle, configurable modem circuitry with a modem profile to transmit data over the first network, wherein the modem profile indicates a wireless communication protocol of the first network.

Example 35 may include the method of claim 34 and/or some other examples herein, wherein transmitting the collected IoT data and/or HSD to the IoT hub comprises: configuring, by the IoT cradle, the configurable modem circuitry with another modem profile to transmit data over the second network, wherein the other modem profile indicates a wireless communication protocol of the second network.

Example 36 may include a method to be performed by an Internet of Things (IoT) hub, the method comprising: receiving, by the IoT hub over a hub network, IoT data and/or hardware state data (HSD) from individual IoT cradles, wherein the IoT data and the HSD are generated by individual IoT devices communicatively attached to the individual IoT cradles; transmitting, by the IoT hub, the collected IoT data and/or HSD to other individual IoT cradles over the hub network; and transmitting, by the IoT hub, the collected IoT data and/or HSD to a client device over the hub network or a cloud network.

Example 37 may include the method of claim 36 and/or some other examples herein, wherein transmitting the collected IoT data and/or HSD to the individual IoT cradles comprises: packaging, by the IoT hub, the IoT data and/or the HSD for consumption by other individual IoT devices attached to the other individual IoT cradles based on a plugin associated with the other individual IoT devices and a policy associated with the individual IoT devices.

Example 38 may include the method of claim 36 and/or some other examples herein, wherein transmitting the collected IoT data and/or HSD to the client device comprises: packaging, by the IoT hub, the IoT data and/or the HSD for consumption by the client device based on a plugin associated with the individual IoT devices that generated the IoT data and/or the HSD and a policy associated with the individual IoT devices.

Example 39 may include the method of claim 36 and/or some other examples herein, further comprising: identifying, by the IoT hub, a policy for sending the collected IoT data and/or the HSD based on a configuration associated with the individual IoT devices; and enforcing, by the IoT hub, the policy.

Example 40 may include the method of claim 39 and/or some other examples herein, wherein enforcing the policy comprises: identifying, by the IoT hub, IoT devices indicated by the policy that are not permitted to obtain the collected IoT data or the collected HSD; and preventing transmission to the other IoT cradles that are communicatively attached to the identified IoT devices.

Example 41 may include the method of claim 36 and/or some other examples herein, further comprising: determining, by the IoT hub, a destination node to obtain the IoT data and/or the HSD; and determining, by the IoT hub, a next node to transmit the IoT data and/or the HSD to be conveyed to the destination node.

Example 42 may include the method of claim 41 and/or some other examples herein, wherein determining the next node comprises: performing, by the IoT hub, a lookup operation on a routing information base using an identifier of the destination node.

Example 43 may include the method of claim 42 and/or some other examples herein, wherein determining the destination node comprises: identifying, by the IoT hub, a destination node identifier indicated by IoT device information, wherein the IoT device information is indicated by the IoT data and/or the HSD or the IoT device information is indicated by a configuration associated with the individual IoT devices.

Example 44. The method of any one of claims 36-37 and/or some other examples herein, wherein transmitting the collected IoT data and/or HSD to the individual IoT cradles comprises: configuring, by the IoT hub, configurable modem circuitry with a modem profile to transmit data over the hub network, wherein the modem profile indicates a wireless communication protocol of the hub network.

Example 45 may include the method of claim 44 and/or some other examples herein, wherein transmitting the collected IoT data and/or HSD to the client device comprises: configuring, by the IoT cradle, the configurable modem circuitry with another modem profile to transmit data over the cloud network, wherein the other modem profile indicates a wireless communication protocol of the cloud network.

Example 46 may include a method for performing a boot installation for an Internet of Things (IoT) cradle, the method comprising: entering, by an IoT hub, a pairing mode with the IoT cradle; determining, by the IoT hub, whether individual IoT devices communicatively attached to the IoT cradle require initiation into an IoT network; and invoking, by the IoT hub, an IoT device initiation procedure when the individual IoT devices require initiation into the IoT network.

Example 47 may include the method of claim 46 and/or some other examples herein, wherein entering the pairing mode comprises: obtaining, by the IoT hub, a unique identifier of the IoT cradle; and establishing, by the IoT hub, an end-to-end encrypted tunnel with the IoT cradle.

Example 48 may include the method of claim 46 and/or some other examples herein, further comprising: determining, by the IoT hub, cradle capabilities of the IoT cradle.

Example 49 may include the method of claim 48, wherein determining the cradle capabilities comprises: identifying, by the IoT hub, the cradle capabilities from one or more messages exchanged during a procedure for entering the pairing mode.

Example 50 may include the method of claim 46 and/or some other examples herein, further comprising: determining, by the IoT hub, whether the IoT cradle requires updates based on the cradle capabilities; obtaining, by the IoT hub, one or more updated components when the IoT cradle is determined to require updates; and provisioning, by the IoT hub, the one or more updated components in the IoT cradle.

Example 51 may include the method of claim 46 and/or some other examples herein, further comprising: determining, by the IoT hub, a route between the IoT hub and the IoT cradle; generating, by the IoT hub, a routing information base for the IoT cradle based on the determined route; and provisioning, by the IoT hub, the routing information based in the IoT cradle.

Example 52 may include one or more computer readable media including instructions, which when executed, cause an Internet of Things (IoT) hub to perform the method of examples 36-45, 46-51, and/or some other examples herein.

Example 53 may include a method for performing an Internet of Things (IoT) device initiation procedure, the method comprising: detecting, by an IoT cradle, an IoT device that is communicatively attached to the IoT cradle; determining, by the IoT cradle, a device pairing configuration for the IoT device; determining, by the IoT cradle, a device sharing configuration for the IoT device; initiating, by the IoT cradle, a test cycle for the IoT device; and reporting, by the IoT cradle, results of the test cycle to an IoT hub.

Example 54 may include the method of claim 53 and/or some other examples herein, further comprising: identifying, by the IoT cradle, IoT device information of the IoT device, wherein the IoT device information comprises identifying information of the IoT device, wherein the identifying information comprises a device identifier of the IoT device, a device type of the IoT device, and a IoT device manufacturer or vendor of the IoT device.

Example 55 may include the method of claim 54 and/or some other examples herein, wherein determining the IoT device information comprises: determining, by the IoT cradle, IoT device capabilities of the IoT device based on the IoT device information, wherein the IoT device capabilities indicate a platform of the IoT device, one or more communications protocols supported by the IoT device, and currently installed software components of the IoT device.

Example 56 may include the method of claim 54 and/or some other examples herein, further comprising: determining, by the IoT cradle, whether a plugin associated with the IoT device is currently installed for the IoT device; and obtaining, by the IoT cradle, the plugin associated with the IoT device when the plugin is not currently installed for the IoT device.

Example 57 may include the method of claim 56 and/or some other examples herein, wherein determining whether the plugin associated with the IoT device is currently installed for the IoT device comprises: transmitting, by the IoT cradle, the IoT device information to an IoT hub; and receiving, by the IoT cradle, an indication from the IoT hub of whether the IoT hub currently includes the plugin.

Example 58 may include the method of claim 57 and/or some other examples herein, wherein obtaining the plugin associated with the IoT device when the plugin is not currently installed for the IoT device: receiving, by the IoT cradle, another indication from the IoT hub that the IoT hub has obtained and installed the plugin at the IoT hub.

Example 59 may include the method of claim 55 and/or some other examples herein, wherein: the device pairing configuration indicates whether the IoT device is to be paired or operate in conjunction with one or more other IoT devices to provide a desired functionality or a desired service; and the data sharing configuration indicates the other devices with which the IoT device is to share IoT data and/or hardware state data (HSD).

Example 60 may include the method of claim 59 and/or some other examples herein, wherein the device pairing information and the device sharing information are indicated by the IoT device capabilities, or indicated by a user through an application used for configuring the IoT device.

Example 61 may include one or more computer readable media including instructions, which when executed, cause an Internet of Things (IoT) cradle to perform the method of examples 26-35, 53-60, and/or some other examples herein.

Example 62 may include an apparatus to be employed as an Internet of Things (IoT) cradle, the apparatus comprising: interface means for communicating with one or more IoT devices to which the IoT cradle is communicatively attached via respective connections with the one or more IoT devices; communication means for communicating with one or more other IoT cradles and a IoT hub; and collection means for: collecting IoT data from the one or more IoT devices via the interface abstraction layer, and provide the collected IoT data to one or more other IoT cradles or the IoT hub via the communication circuitry; and collecting hardware state data (HSD) from the one or more IoT devices via the interface abstraction layer, and provide the collected HSD to the one or more other IoT cradles or the IoT hub via the communication circuitry.

Example 63 may include the apparatus of example 62 and/or some other examples herein, wherein the collection means comprises data plane means and a control plane means, and wherein: the data plane means is for collecting the IoT data from the one or more IoT devices via the interface abstraction layer, and provide the collected IoT data to one or more other IoT cradles or the IoT hub via the communication circuitry; and the control plane means is for collecting the HSD from the one or more IoT devices via the interface abstraction layer, and provide the collected HSD to the one or more other IoT cradles or the IoT hub via the communication circuitry.

Example 64 may include the apparatus of example 62 or 63 and/or some other examples herein, wherein the respective connections comprise wired connections between the one or more IoT devices and the IoT cradle, wireless radio links between the one or more IoT devices and the IoT cradle, or connections between the one or more IoT devices and the IoT cradle via one or more input/output (I/O) pins.

Example 65 may include the apparatus of example 62 or 63 and/or some other examples herein, wherein the communication means is for communicating with the one or more other IoT cradles over a mesh network and for communicating with the IoT hub over a wireless local area network (WLAN).

Example 66 may include the apparatus of example 62 or 63 and/or some other examples herein, wherein the communication means is for communicating with the one or more other IoT cradles in a fog computing system and for communicating with the IoT hub over a WLAN.

Example 67 may include the apparatus of example 65 or 66 and/or some other examples herein, wherein communication means is for communicating in the mesh network or the fog computing system using a first wireless communication protocol and for communicating in the WLAN using a second wireless communication protocol, wherein the first wireless communication protocol is different than the second wireless communication protocol.

Example 68 may include the apparatus of example 62 or 63 and/or some other examples herein, wherein the interface means is for: detecting a connection to a new IoT device connected with the IoT cradle; and obtaining identification information of the new IoT device, the identification information comprising a device identifier (ID) of the new IoT device, a device type of the new IoT device, or a manufacturer or vendor of new IoT device.

Example 69 may include the apparatus of example 68 and/or some other examples herein, wherein the communication means is for: transmitting a first message including the identification information to the IoT hub; and receiving, from the IoT hub, a second message including data sharing permissions, wherein the data sharing permissions comprise device pairing information and user management information, wherein the device pairing information indicates one or more IoT devices that are permitted to obtain IoT data generated by the new IoT device and one or more IoT devices that are permitted to access hardware resources of the new IoT device, and wherein the user management information indicates one or more client devices that are permitted to obtain the IoT data generated by the new IoT device and one or more client devices that are permitted to access hardware resources of the new IoT device.

Example 70 may include the apparatus of example 63 and/or some other examples herein, further comprising installation means for: initializing a pairing mode, wherein the pairing mode is to be initialized when the IoT cradle is powered on or in response to receipt of an instruction to enter the pairing mode; broadcasting a unique ID of the IoT cradle to the one or more other IoT cradles and the IoT hub; establishing an end-to-end encrypted tunnel with the IoT hub in response to receipt of a message from the IoT hub based on the unique ID; and controlling the communication means to transmit, to the IoT hub over the end-to-end encrypted tunnel, a cradle capabilities message indicating a platform of the IoT cradle, one or more supported communications protocols, and identification information of the one or more IoT devices attached to the IoT cradle, wherein the identification information of each of the one or more IoT devices comprises a device ID, a device type, and a IoT device manufacturer or vendor.

Example 71 may include the apparatus of example 70 and/or some other examples herein, wherein: the communication means is for receiving, from the IoT hub over the end-to-end encrypted tunnel, a routing information base (RIB), wherein the RIB indicates routes for transmission of the IoT data and the HSD to individual IoT cradles of the one or more other IoT cradles and routes for transmission of the IoT data and the HSD to the IoT hub, the data plane means is for providing, via the communication circuitry, the collected IoT data to the individual IoT cradles or the IoT hub according to the routes indicated by the RIB, and the control plane entity is for providing, via the communication circuitry, the collected HSD to the individual IoT cradles or the IoT hub according to the routes indicated by the RIB.

Example 72 may include an apparatus to be employed as an Internet of Things (IoT) hub, the apparatus comprising: communication means for communicating IoT data and/or hardware state data (HSD) with individual IoT cradles over a first network, and communicate the IoT data and/or the HSD with a client device over a second network, according to policy configurations of the individual IoT devices, wherein the individual IoT cradles obtain the IoT data and the HSD from individual IoT devices to which they are communicatively attached, and wherein the IoT data indicates data associated with an event detected by the individual IoT devices, and the HSD is to facilitate access to hardware resources of the individual IoT devices; policy enforcement means for enforcing policy configurations of the individual IoT cradles, wherein the policy configurations indicate devices that are permitted to access the IoT data or the HSD.

Example 74 may include the apparatus of example 72 and/or some other examples herein, wherein the apparatus further comprises an application interface means for: hosting an application (app) comprising one or more interfaces through which the client device is to access the hardware resources of individual IoT devices, and providing one or more interfaces through with the client device is to define the policy configurations to be enforced by the policy layer.

Example 75 may include the apparatus of example 74 and/or some other examples herein, wherein the apparatus further comprises application means for: hosting individual plugins corresponding to the individual IoT devices, wherein the individual plugins indicate parameters for presenting IoT data and the HSD to the app and parameters for providing user data to the individual IoT devices, wherein the user data is obtained from the app via the application interface.

Example 76 may include the apparatus of example 75 and/or some other examples herein, wherein the apparatus further comprises internet protocol (IP) means comprising the policy enforcement means, the IP means for: packaging the IoT data and the HSD for delivery to the AL; and packaging the user data obtained from app for delivery to the individual IoT devices via the individual IoT cradles.

Example 77 may include the apparatus of example 76 and/or some other examples herein, wherein the apparatus further comprises a transfer protocol means for: providing flow control functionality for the IoT data and the HSD communicated between the client device and the one or more IoT devices according to the policies enforced by the policy layer; determining, based on the HSD or the IoT data, a current status of individual IoT devices, current preferences of individual IoT devices, and current configurations of individual IoT devices; generating status, preference, and configuration sets (SPCs) for the for individual IoT devices; and providing the generated SPCs to the IPL.

Example 78 may include the apparatus of example 77 and/or some other examples herein, wherein the apparatus further comprises link control means for: establishing a flow for protocol data units (PDUs) of the HSD or the IoT data; assigning flow parameters to the established flow based on a data type of the flow, wherein the data type indicates whether packets of the flow convey the HSD or the IoT data, and wherein the flow parameters comprise a flow category of the flow, a flow priority of the flow, quality of service (QoS) parameters for the HSD or IoT data, a network type to be used to communicate the HSD or IoT data, a traffic type for the flow, and the data type of the flow.

Example 79 may include the apparatus of example 78 and/or some other examples herein, wherein the communication means is for: indicating physical information to the link control means, the transfer protocol means, the IP means, or the application means, wherein the physical information comprises attachment information indicating how the individual IoT devices are communicatively attached to the individual IoT cradles, and power information indicating how are the individual IoT devices are powered.

Example 80 may include the apparatus of any one of examples 72-79 and/or some other examples herein, wherein the first network comprises a first communication protocol and the second network comprises a second communication protocol, wherein the first communication protocol is different than the second communication protocol, wherein the communication means comprises first communication means for communicating the IoT data and/or the HSD over the first network in accordance with the first communication protocol and second communication means for communicating the IoT data and/or the HSD over the second network in accordance with the second communication protocol, wherein the first communication protocol and the second communication protocol are different wireless communication protocols, or the first communication protocol a wireless communication protocol and the second communication protocol is a wired communication protocol.

Example 81 may include an apparatus to be employed as an Internet of Things (IoT) cradle, the apparatus comprising: collection means for collecting IoT data and/or hardware state data (HSD) from individual IoT devices communicatively attached to the IoT cradle; first communication means for transmitting the collected IoT data and/or HSD to one or more other IoT cradles over a first network; and second communication means for transmitting the collected IoT data and/or HSD to an IoT hub over a second network.

Example 82 may include the apparatus of example 81 and/or some other examples herein, wherein the collection means comprises: data plane means for sending the collected IoT data to the one or more other IoT cradles over the first network; and control plane means for sending the collected HSD to the one or more other IoT cradles over the first network.

Example 83 may include the apparatus of example 82 and/or some other examples herein, wherein the collection means comprises: data plane means for sending the collected IoT data to the IoT hub over the second network; and control plane means for sending the collected HSD to the IoT hub over the second network.

Example 84 may include the apparatus of example 81 and/or some other examples herein, further comprising: means for identifying a policy for sending the collected IoT data and/or the HSD based on a configuration associated with the individual IoT devices; and means for enforcing the policy.

Example 85 may include the apparatus of example 84 and/or some other examples herein, wherein the means for enforcing comprises: means for identifying IoT devices indicated by the policy that are not permitted to obtain the collected IoT data or the collected HSD; and means for preventing transmission to IoT cradles of the one or more IoT cradles that are communicatively attached to the identified IoT devices.

Example 86 may include the apparatus of example 81 and/or some other examples herein, further comprising: means for determining a destination node to obtain the IoT data and/or the HSD; and means for determining a next node to transmit the IoT data and/or the HSD to be conveyed to the destination node.

Example 87 may include the apparatus of example 86 and/or some other examples herein, wherein the means for determining the next node comprises: means for performing a lookup operation on a routing information base using an identifier of the destination node.

Example 88 may include the apparatus of example 87 and/or some other examples herein, wherein the means for determining the destination node comprises: means for identifying a destination node identifier indicated by IoT device information, wherein the IoT device information is indicated by the IoT data and/or the HSD or the IoT device information is indicated by a configuration associated with the individual IoT devices.

Example 89 may include the apparatus of any one of examples 81-83 and/or some other examples herein, wherein the first communication means comprises: means for configuring configurable modulation means with a profile to transmit data over the first network, wherein the profile indicates a wireless communication protocol of the first network.

Example 90 may include the apparatus of example 89 and/or some other examples herein, wherein the second communication means comprises: means for configuring configurable modulation means with another profile to transmit data over the second network, wherein the other profile indicates a wireless communication protocol of the second network.

Example 91 may include the apparatus of examples 81-90 and/or some other examples herein, further comprising device initiation means for: detecting an IoT device that is communicatively attached to the IoT cradle; determining a device pairing configuration for the IoT device; determining a device sharing configuration for the IoT device; and initiating a test cycle for the IoT device; and reporting results of the test cycle to an IoT hub.

Example 92 may include the apparatus of example 91 and/or some other examples herein, wherein the device initiation means is for: identifying IoT device information of the IoT device, wherein the IoT device information comprises identifying information of the IoT device, wherein the identifying information comprises a device identifier of the IoT device, a device type of the IoT device, and a IoT device manufacturer or vendor of the IoT device.

Example 93 may include the apparatus of example 92 and/or some other examples herein, wherein, in the determining the IoT device information, the device initiation means is for: determining IoT device capabilities of the IoT device based on the IoT device information, wherein the IoT device capabilities indicate a platform of the IoT device, one or more communications protocols supported by the IoT device, and currently installed software components of the IoT device.

Example 94 may include the apparatus of example 92 and/or some other examples herein, wherein the device initiation means is for: determining whether a plugin associated with the IoT device is currently installed for the IoT device; and obtaining the plugin associated with the IoT device when the plugin is not currently installed for the IoT device.

Example 95 may include the apparatus of example 94 and/or some other examples herein, wherein, in determining whether the plugin associated with the IoT device is currently installed for the IoT device, the device initiation means is for: causing transmission of the IoT device information to an IoT hub; and causing receipt of an indication from the IoT hub of whether the IoT hub currently includes the plugin.

Example 96 may include the apparatus of example 95 and/or some other examples herein, wherein, in obtaining the plugin associated with the IoT device when the plugin is not currently installed for the IoT device, the device initiation means is for: causing receipt of another indication from the IoT hub that the IoT hub has obtained and installed the plugin at the IoT hub.

Example 97 may include the apparatus of example 93 and/or some other examples herein, wherein the device pairing configuration indicates whether the IoT device is to be paired or operate in conjunction with one or more other IoT devices to provide a desired functionality or a desired service.

Example 98 may include the apparatus of example 97 and/or some other examples herein, wherein the device pairing information is indicated by the IoT device capabilities, or indicated by a user through an application used for configuring the IoT device Example 99 may include the apparatus of example 93 and/or some other examples herein, wherein the data sharing configuration indicates the other devices with which the IoT device is to share IoT data and/or hardware state data (HSD).

Example 100 may include the apparatus of example 99, wherein the device sharing information is indicated by the IoT device capabilities, or indicated by a user through an application used for configuring the IoT device.

Example 101 may include an apparatus to be employed as an Internet of Things (IoT) hub, the apparatus comprising: first communication means for: receiving, by the IoT hub over a hub network, IoT data and/or hardware state data (HSD) from individual IoT cradles, wherein the IoT data and the HSD are generated by individual IoT devices communicatively attached to the individual IoT cradles, and transmitting the collected IoT data and/or HSD to other individual IoT cradles over the hub network; and second communication means for transmitting the collected IoT data and/or HSD to a client device over the hub network or a cloud network.

Example 102 may include the apparatus of example 101 and/or some other examples herein, further comprising: means for packaging the IoT data and/or the HSD for consumption by other individual IoT devices attached to the other individual IoT cradles based on a plugin associated with the other individual IoT devices and a policy associated with the individual IoT devices.

Example 103 may include the apparatus of example 101 and/or some other examples herein, further comprising: means for packaging the IoT data and/or the HSD for consumption by the client device based on a plugin associated with the individual IoT devices that generated the IoT data and/or the HSD and a policy associated with the individual IoT devices.

Example 104 may include the apparatus of example 101, further comprising: means for identifying a policy for sending the collected IoT data and/or the HSD based on a configuration associated with the individual IoT devices; and means for enforcing the policy.

Example 105 may include the apparatus of example 104 and/or some other examples herein, wherein the means for enforcing the policy is for: identifying IoT devices indicated by the policy that are not permitted to obtain the collected IoT data or the collected HSD; and preventing transmission to the other IoT cradles that are communicatively attached to the identified IoT devices.

Example 106 may include the apparatus of example 101 and/or some other examples herein, further comprising: means for determining a destination node to obtain the IoT data and/or the HSD; and means for determining a next node to transmit the IoT data and/or the HSD to be conveyed to the destination node.

Example 107 may include the apparatus of example 106 and/or some other examples herein, wherein the means for determining the next node is for: performing a lookup operation on a routing information base using an identifier of the destination node.

Example 108 may include the apparatus of example 107 and/or some other examples herein, wherein the means for determining the destination node is for: identifying a destination node identifier indicated by IoT device information, wherein the IoT device information is indicated by the IoT data and/or the HSD or the IoT device information is indicated by a configuration associated with the individual IoT devices.

Example 109 may include the apparatus of any one of examples 101-102 and/or some other examples herein, wherein the first communication means is for: configuring configurable modulation means with a profile to transmit data over the hub network, wherein the profile indicates a wireless communication protocol of the hub network.

Example 110 may include the apparatus of example 109 and/or some other examples herein, wherein the second communication means is for: configuring configurable modulation means with another profile to transmit data over the cloud network, wherein the other profile indicates a wireless communication protocol of the cloud network.

Example 111 may include the apparatus of examples 101-110 and/or some other examples herein, further comprising installation means for: entering a pairing mode with the IoT cradle; determining whether individual IoT devices communicatively attached to the IoT cradle require initiation into an IoT network; and invoking an IoT device initiation procedure when the individual IoT devices require initiation into the IoT network.

Example 112 may include the method of claim 111 and/or some other examples herein, wherein the installation means is for: obtaining a unique identifier of the IoT cradle; and establishing an end-to-end encrypted tunnel with the IoT cradle.

Example 113 may include the method of claim 111 and/or some other examples herein, wherein the installation means is for: determining cradle capabilities of the IoT cradle.

Example 114 may include the method of claim 113 and/or some other examples herein, wherein, in determining the cradle capabilities, the installation means is for: identifying the cradle capabilities from one or more messages exchanged during a procedure for entering the pairing mode.

Example 115 may include the method of claim 111 and/or some other examples herein, wherein the installation means is for: determining whether the IoT cradle requires updates based on the cradle capabilities; obtaining one or more updated components when the IoT cradle is determined to require updates; and provisioning the one or more updated components in the IoT cradle.

Example 116 may include the method of claim 111 and/or some other examples herein, wherein the installation means is for: determining a route between the IoT hub and the IoT cradle; generating a routing information base for the IoT cradle based on the determined route; and provisioning the routing information based in the IoT cradle.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. An apparatus to be employed as an Internet of Things (IoT) cradle, the apparatus comprising:
   processor circuitry arranged to operate an interface abstraction layer to communicate with one or more IoT devices to which the IoT cradle is communicatively attached via respective connections with the one or more IoT devices;
   communication circuitry coupled with the processor circuitry, the communication circuitry arranged to communicatively attach the IoT cradle with one or more other IoT cradles and an IoT hub;
   the processor circuitry arranged to operate a data plane entity to collect IoT data from the one or more IoT devices via the interface abstraction layer, and provide the collected IoT data to one or more other IoT cradles or the IoT hub via the communication circuitry; and
   the processor circuitry arranged to operate a control plane entity to collect hardware state data (HSD) from the one or more IoT devices via the interface abstraction layer, and provide the collected HSD to the one or more other IoT cradles or the IoT hub via the communication circuitry.

2. The apparatus of claim 1, wherein the respective connections comprise wired connections between the one or more IoT devices and the IoT cradle, wireless radio links between the one or more IoT devices and the IoT cradle, or connections between the one or more IoT devices and the IoT cradle via one or more input/output (I/O) pins.

3. The apparatus of claim 1, wherein the communication circuitry is arranged to communicatively attach the IoT cradle to the IoT hub over a wireless local area network (WLAN).

4. The apparatus of claim 3, wherein the communication circuitry is arranged to communicatively attach the IoT cradle to the one or more other IoT cradles in a fog computing system or communicatively attach the IoT cradle to the one or more other IoT cradles over a mesh network.

5. The apparatus of claim 4, wherein the communication circuitry is arranged to communicate in the mesh network or the fog computing system using a first wireless communication protocol and communicate in the WLAN using a second wireless communication protocol, wherein the first wireless communication protocol is different than the second wireless communication protocol.

6. The apparatus of claim 1, wherein the communication circuitry comprises configurable modem circuitry, wherein the configurable modem circuitry comprises a field-programmable gate array (FPGA), a programmable logic device (PLD), a complex PLD (CPLD), a high-capacity PLD (HCPLD), an application-specific integrated circuit (ASIC), a structured ASIC, a System on Chip (SoC), or a programmable system on chip (PSoC).

7. The apparatus of claim 6, wherein the apparatus further comprises a modem manager, and the processor circuitry is arranged to operate the modem manager to:
   load a first modem profile or a second modem profile into the configurable modem circuitry,
   the first modem profile for communicating over the IoT data or the HSD over a first network, and
   the second modem profile for communicating over the IoT data or the HSD over a second network, wherein one or more collection entities are arranged to instruct the modem manager to load the first modem profile or the second modem profile into the configurable modem circuitry.

8. The apparatus of claim 6, wherein the processor circuitry comprises a system on chip (SoC) or a multi-chip package (MCP) including one or more multi-core processors, one or more single-core processors, or one or more ultra-low voltage processors.

9. The apparatus of claim 6, wherein the processor circuitry comprises:
a first circuit preconfigured with logic of the interface abstraction layer, the first circuit being an FPGA, PLD, CPLD, HCPLD, ASIC, structured ASIC, SoC, or PSoC;
a second circuit preconfigured with logic of the data plane entity, the second circuit being an FPGA, PLD, CPLD, HCPLD, ASIC, structured ASIC, SoC, or PSoC;
a third circuit preconfigured with logic of the control plane entity, the third circuit being an FPGA, PLD, CPLD, HCPLD, ASIC, structured ASIC, SoC, or PSoC; and
a fourth circuit preconfigured with logic of the modem manager, the fourth circuit being an FPGA, PLD, CPLD, HCPLD, ASIC, structured ASIC, SoC, or PSoC.

10. An apparatus to be employed as an Internet of Things (IoT) cradle, the apparatus comprising:
processor circuitry arranged to operate an interface abstraction layer to communicate with one or more IoT devices to which the IoT cradle is communicatively attached via respective connections with the one or more IoT devices;
communication circuitry coupled with the processor circuitry, the communication circuitry arranged to communicatively attach the IoT cradle with one or more other IoT cradles in a fog computing system and communicatively attach the IoT cradle to an IoT hub over a wireless local area network (WLAN); and
the processor circuitry arranged to operate one or more collection entities to:
collect IoT data from the one or more IoT devices via the interface abstraction layer, and provide the collected IoT data to one or more other IoT cradles or the IoT hub via the communication circuitry; and
collect hardware state data (HSD) from the one or more IoT devices via the interface abstraction layer, and provide the collected HSD to the one or more other IoT cradles or the IoT hub via the communication circuitry.

11. The apparatus of claim 10, wherein the one or more collection entities comprise a data plane entity and a control plane entity, and wherein:
the data plane entity is arranged to collect the IoT data from the one or more IoT devices via the interface abstraction layer, and provide the collected IoT data to one or more other IoT cradles or the IoT hub via the communication circuitry; and
the control plane entity is arranged to collect the HSD from the one or more IoT devices via the interface abstraction layer, and provide the collected HSD to the one or more other IoT cradles or the IoT hub via the communication circuitry.

12. The apparatus of claim 10, wherein the respective connections comprise wired connections between the one or more IoT devices and the IoT cradle, wireless radio links between the one or more IoT devices and the IoT cradle, or connections between the one or more IoT devices and the IoT cradle via one or more input/output (I/O) pins.

13. The apparatus of claim 10, wherein the communication circuitry is arranged to communicatively attach the IoT cradle to at least one additional IoT cradle over a mesh network.

14. The apparatus of claim 13, wherein the communication circuitry is arranged to:
communicate in the mesh network or the fog computing system using a first communication protocol; and
communicate in the WLAN using a second communication protocol, the second communication protocol being different than the first communication protocol.

15. The apparatus of claim 10, wherein the communication circuitry comprises configurable modem circuitry, the apparatus further comprises a modem manager, and the processor circuitry is arranged to operate the modem manager to:
load, into the configurable modem circuitry, a first modem profile for communicating over the IoT data or the HSD over a first network; and
load, into the configurable modem circuitry, a second modem profile for communicating over the IoT data or the HSD over a second network,
wherein the one or more collection entities are to instruct the modem manager to load the first modem profile or the second modem profile into the configurable modem circuitry.

16. The apparatus of claim 15, wherein the configurable modem circuitry comprises a field-programmable gate array (FPGA), a programmable logic device (PLD), a complex PLD (CPLD), a high-capacity PLD (HCPLD), an application-specific integrated circuit (ASIC), a structured ASIC, a System on Chip (SoC), or a programmable system on chip (PSoC).

17. The apparatus of claim 16, wherein the processor circuitry comprises a system on chip (SoC) or a multi-chip package (MCP) including one or more multi-core processors, one or more single-core processors, or one or more ultra-low voltage processors.

18. The apparatus of claim 16, wherein the processor circuitry comprises:
a first circuit preconfigured with logic of the interface abstraction layer, the first circuit being an FPGA, PLD, CPLD, HCPLD, ASIC, structured ASIC, SoC, or PSoC;
individual second circuits preconfigured with logic of respective ones of the one or more collection entities, the individual second circuits being FPGAs, PLDs, CPLDs, HCPLDs, ASICs, structured ASICs, SoCs, or PSoCs; and
a third circuit preconfigured with logic of the modem manager, the third circuit being an FPGA, PLD, CPLD, HCPLD, ASIC, structured ASIC, SoC, or PSoC.

19. One or more non-transitory computer-readable media (NTCRM) comprising instructions for operating an Internet of Things (IoT) cradle, the IoT cradle including processor circuitry and configurable communication circuitry arranged to communicatively attach the IoT cradle with one or more other IoT cradles and an IoT hub, wherein execution of the instructions by the processor circuitry is to cause the IoT cradle to:
operate an interface abstraction layer to communicate with one or more IoT devices to which the IoT cradle is communicatively attached via respective connections with the one or more IoT devices;
operate one or more collection entities to:
collect IoT data and hardware state data (HSD) from one or more IoT devices via the interface abstraction layer,
instruct a modem manager to load a first modem profile or a second modem profile into the configurable communication circuitry, the first modem profile for communicating over a first network and the second modem profile for communicating over a second network, and provide the collected IoT data and the collected HSD to the one or more other IoT cradles or the IoT hub via the communication circuitry based on a loaded one of the first modem profile or the second modem profile; and operate the modem manager to load, into the configurable communication circuitry, the first modem profile or the second modem profile for communicating the IoT data or the HSD over a second network.

20. The one or more NTCRM of claim 19, wherein the one or more collection entities comprise a data plane entity and a control plane entity, and wherein execution of the instructions is to further cause the IoT cradle to:

operate the data plane entity to collect the IoT data from the one or more IoT devices via the interface abstraction layer, and provide the collected IoT data to one or more other IoT cradles or the IoT hub via the communication circuitry; and operate the control plane entity to collect the HSD from the one or more IoT devices via the interface abstraction layer, and provide the collected HSD to the one or more other IoT cradles or the IoT hub via the communication circuitry.

21. The one or more NTCRM of claim 19, wherein the respective connections comprise wired connections between the one or more IoT devices and the IoT cradle, wireless radio links between the one or more IoT devices and the IoT cradle, or one or more input/output (I/O) pin connections between the one or more IoT devices and the IoT cradle via the one or more I/O pins.

22. The one or more NTCRM of claim 19, wherein the IoT cradle is communicatively attached to the IoT hub over a wireless local area network (WLAN).

23. The one or more NTCRM of claim 22, wherein the IoT cradle is communicatively attached to the one or more other IoT cradles over a mesh network wherein the communication circuitry is arranged to communicate in the mesh network using a first communication protocol and communicate in the WLAN using a second communication protocol, wherein the first communication protocol is different than the second communication protocol.

24. The one or more NTCRM of claim 22, wherein the IoT cradle is communicatively attached to the one or more other IoT cradles over a fog computing system, and wherein the communication circuitry is arranged to communicate in the fog computing system using a first communication protocol and communicate in the WLAN using a second communication protocol, wherein the first communication protocol is different than the second communication protocol.

25. The one or more NTCRM of claim 19, wherein the configurable communication circuitry comprises a field-programmable gate array (FPGA), a programmable logic device (PLD), a complex PLD (CPLD), a high-capacity PLD (HCPLD), an application-specific integrated circuit (ASIC), a structured ASIC, or a programmable system on chip (PSoC).

26. The apparatus of claim 25, wherein the processor circuitry comprises a system on chip (SoC) or a multi-chip package (MCP) including one or more multi-core processors, one or more single-core processors, or one or more ultra-low voltage processors.

27. The apparatus of claim 25, wherein the processor circuitry comprises:

a first circuit preconfigured with logic of the interface abstraction layer, the first circuit being an FPGA, PLD, CPLD, HCPLD, ASIC, structured ASIC, SoC, or PSoC;

individual second circuits preconfigured with logic of respective ones of the one or more collection entities, the individual second circuits being FPGAs, PLDs, CPLDs, HCPLDs, ASICs, structured ASICs, SoCs, or PSoCs; and a third circuit preconfigured with logic of the modem manager, the third circuit being an FPGA, PLD, CPLD, HCPLD, ASIC, structured ASIC, SoC, or PSoC.

* * * * *